Dec. 4, 1945.    R. R. TREXLER    2,390,136
LIQUID DISPENSING APPARATUS
Filed April 18, 1939    12 Sheets-Sheet 1
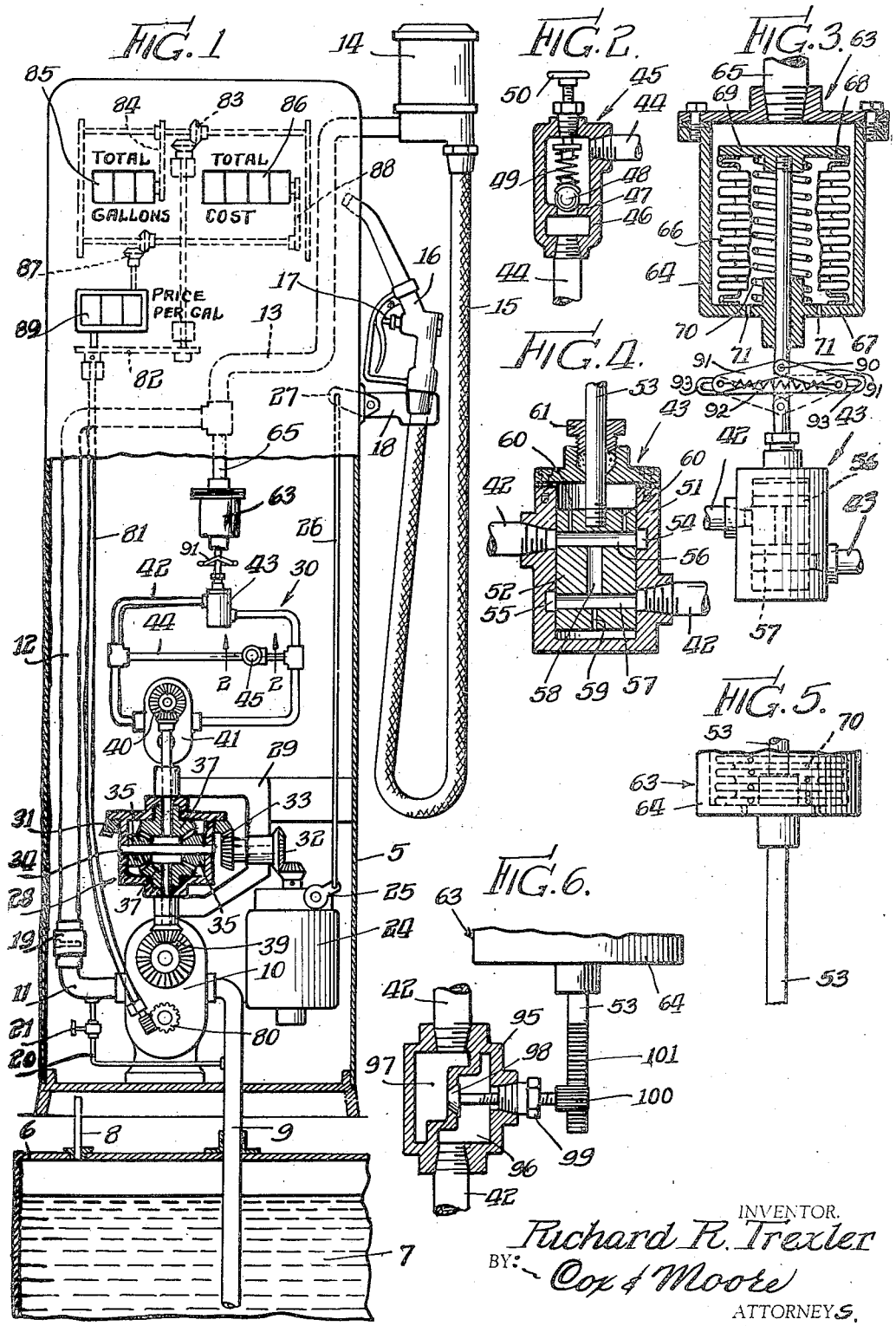
INVENTOR.
Richard R. Trexler
BY: Cox & Moore
ATTORNEYS.

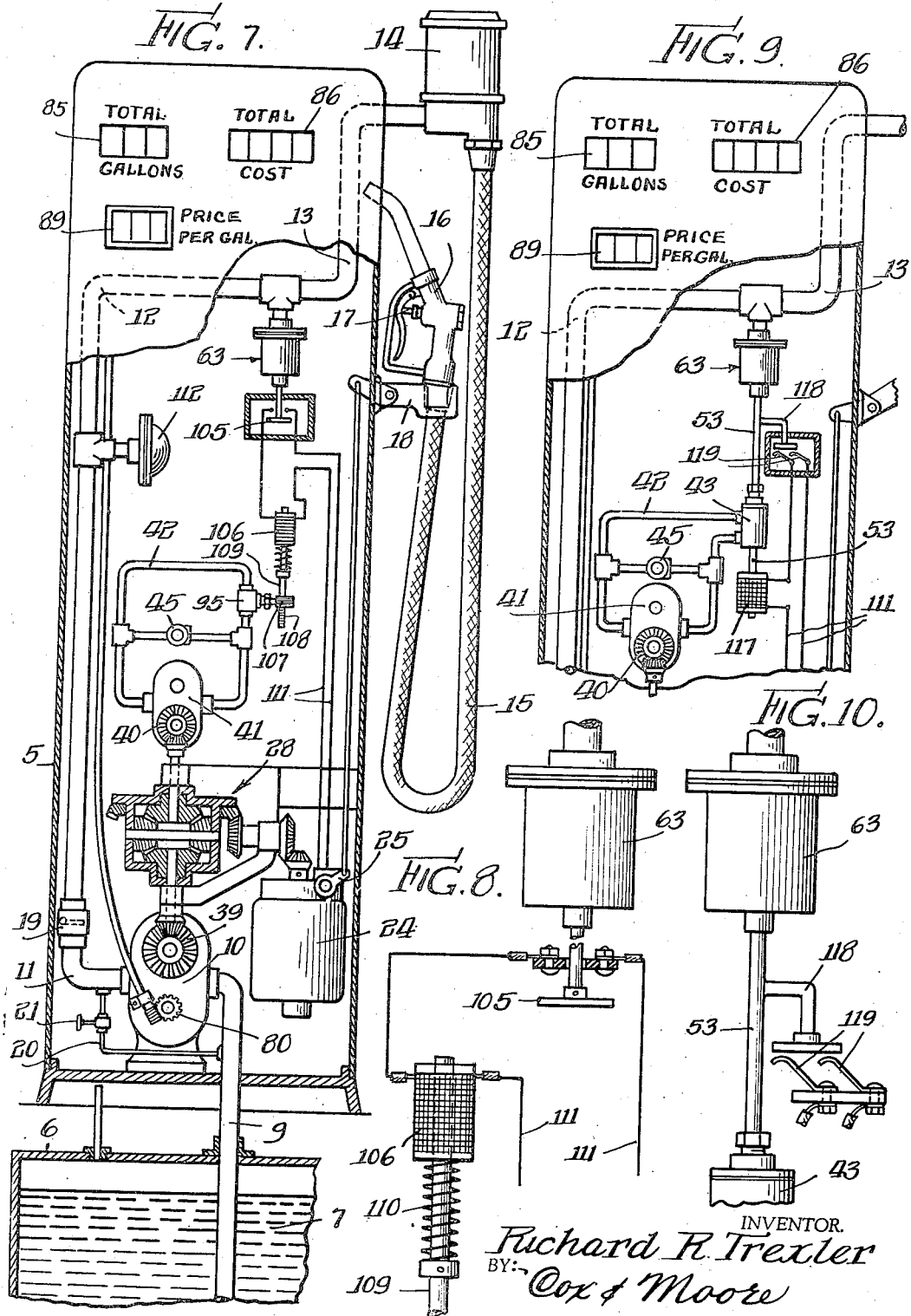

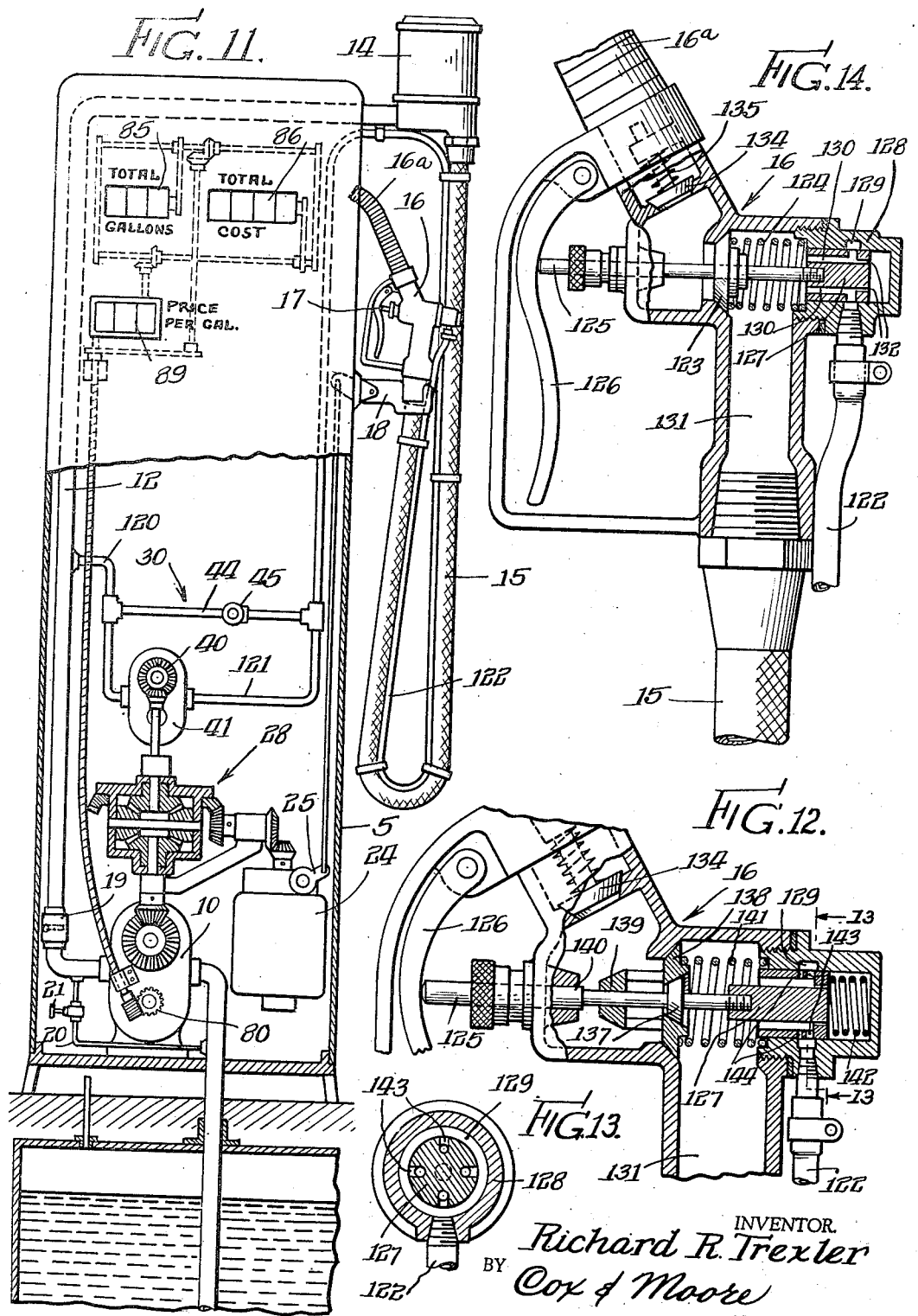

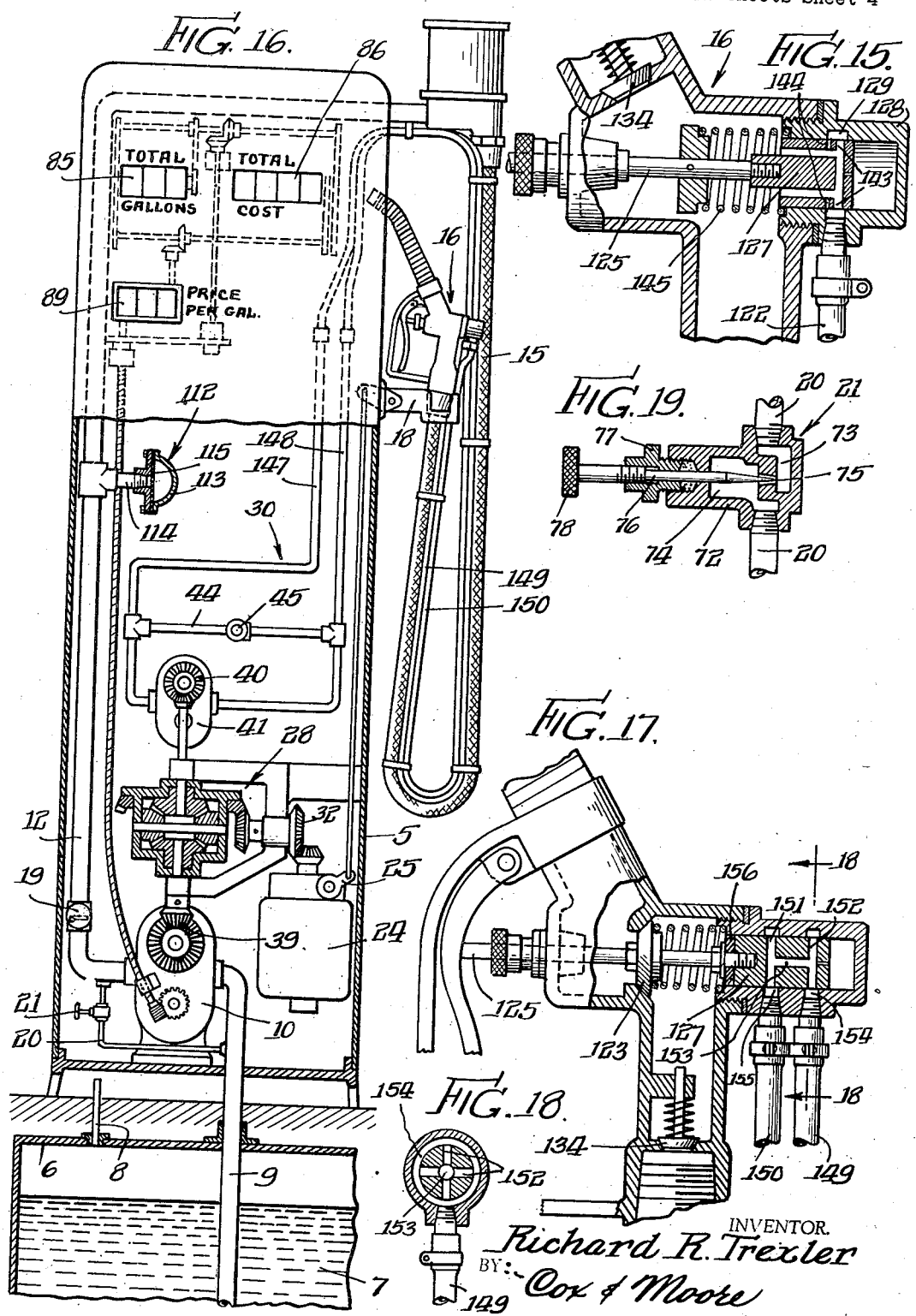

Dec. 4, 1945.  R. R. TREXLER  2,390,136
LIQUID DISPENSING APPARATUS
Filed April 18, 1939  12 Sheets-Sheet 5
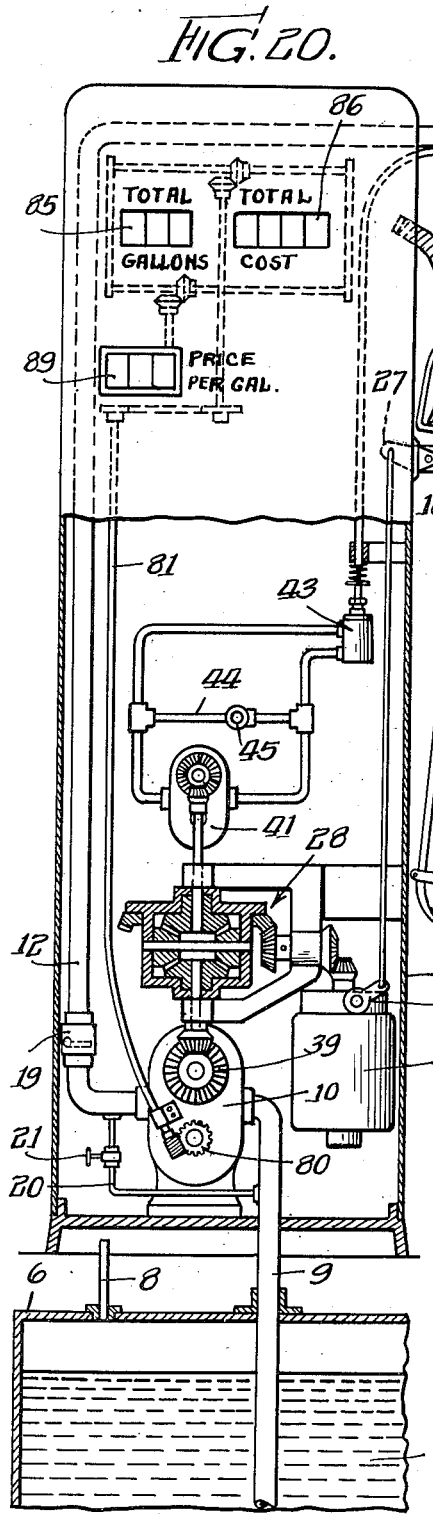
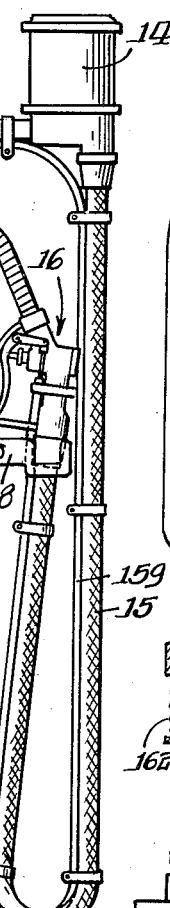
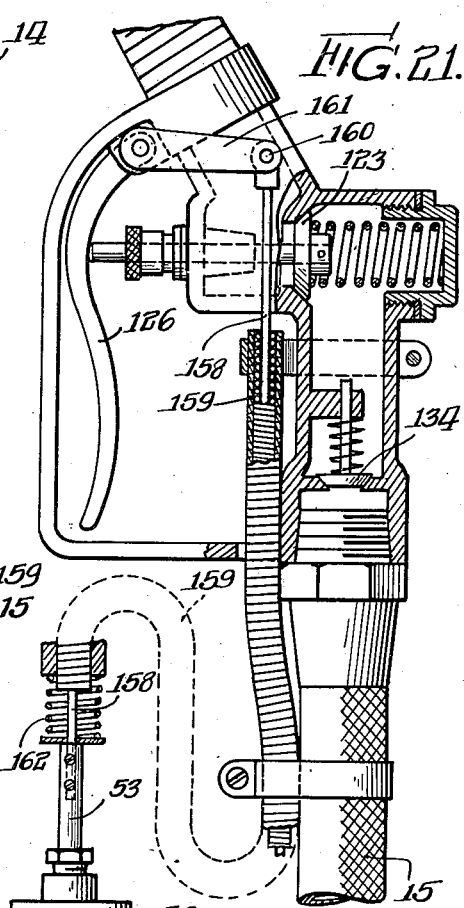
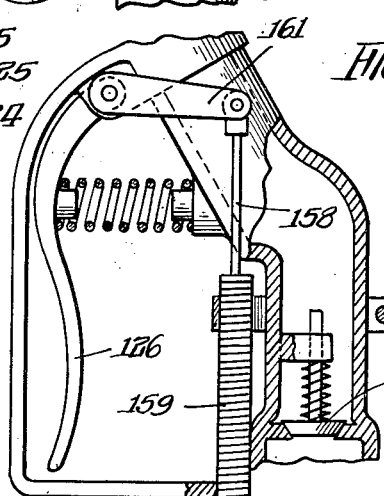
INVENTOR.
BY: Richard R. Trexler
Cox & Moore ATTORNEYS.

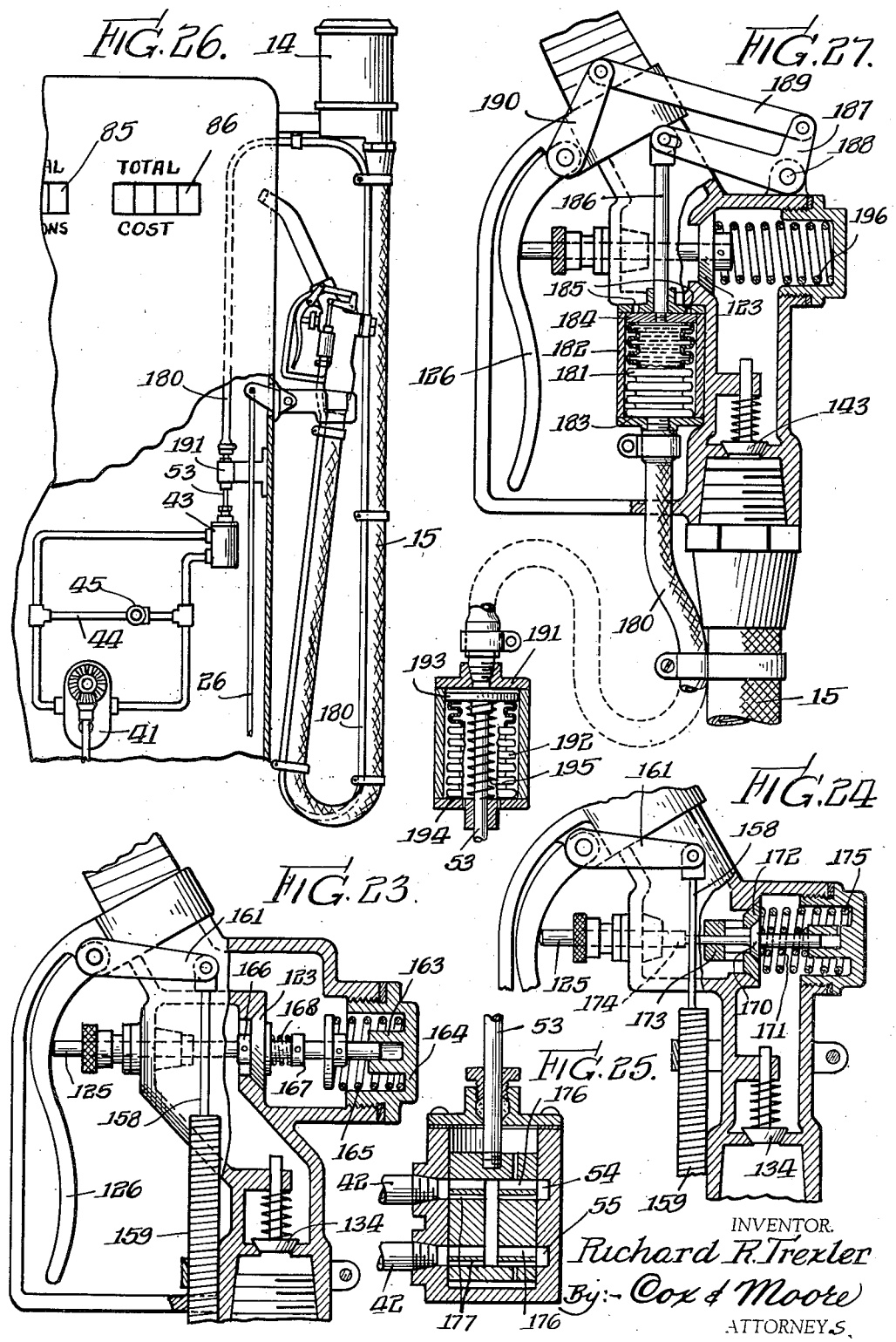

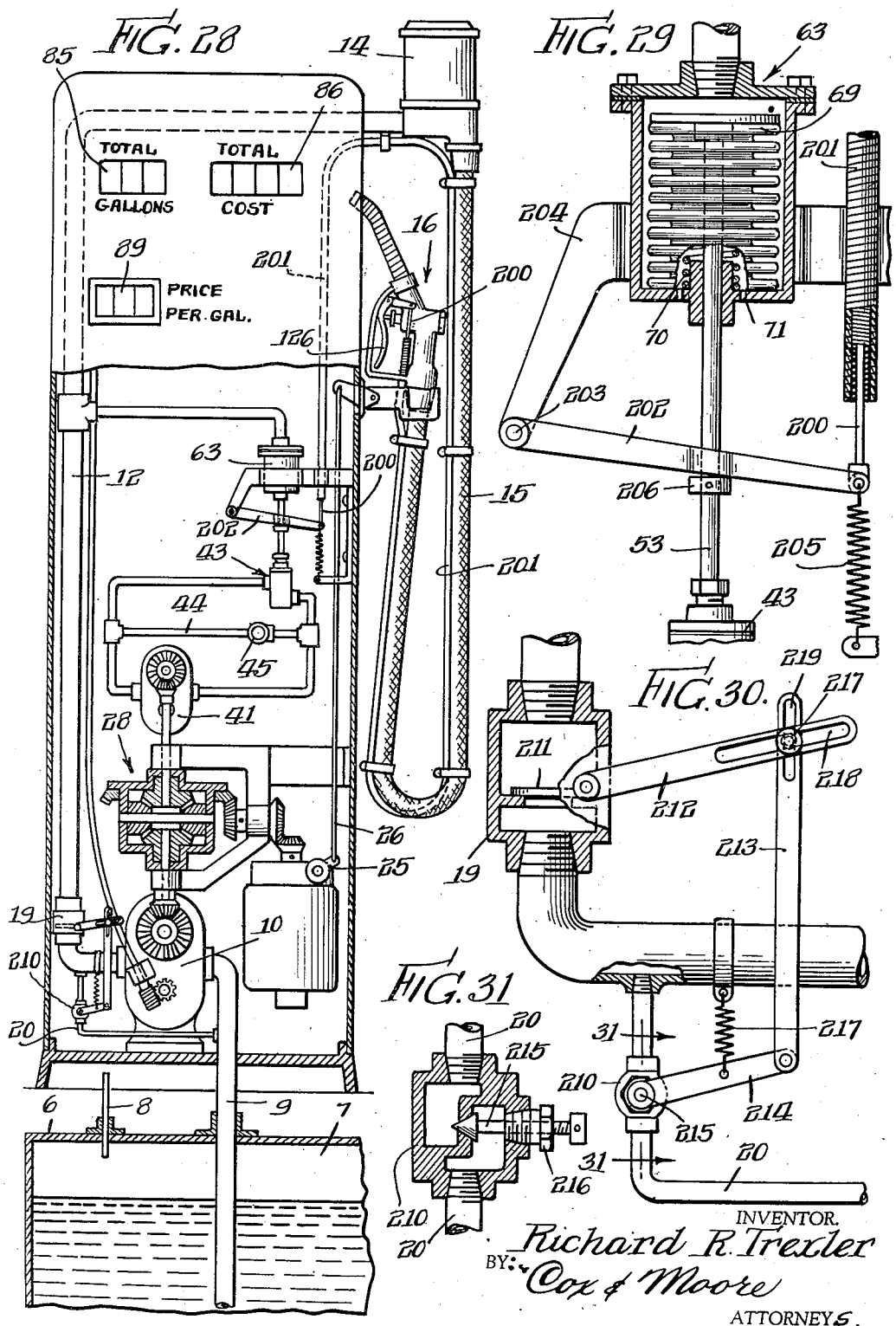

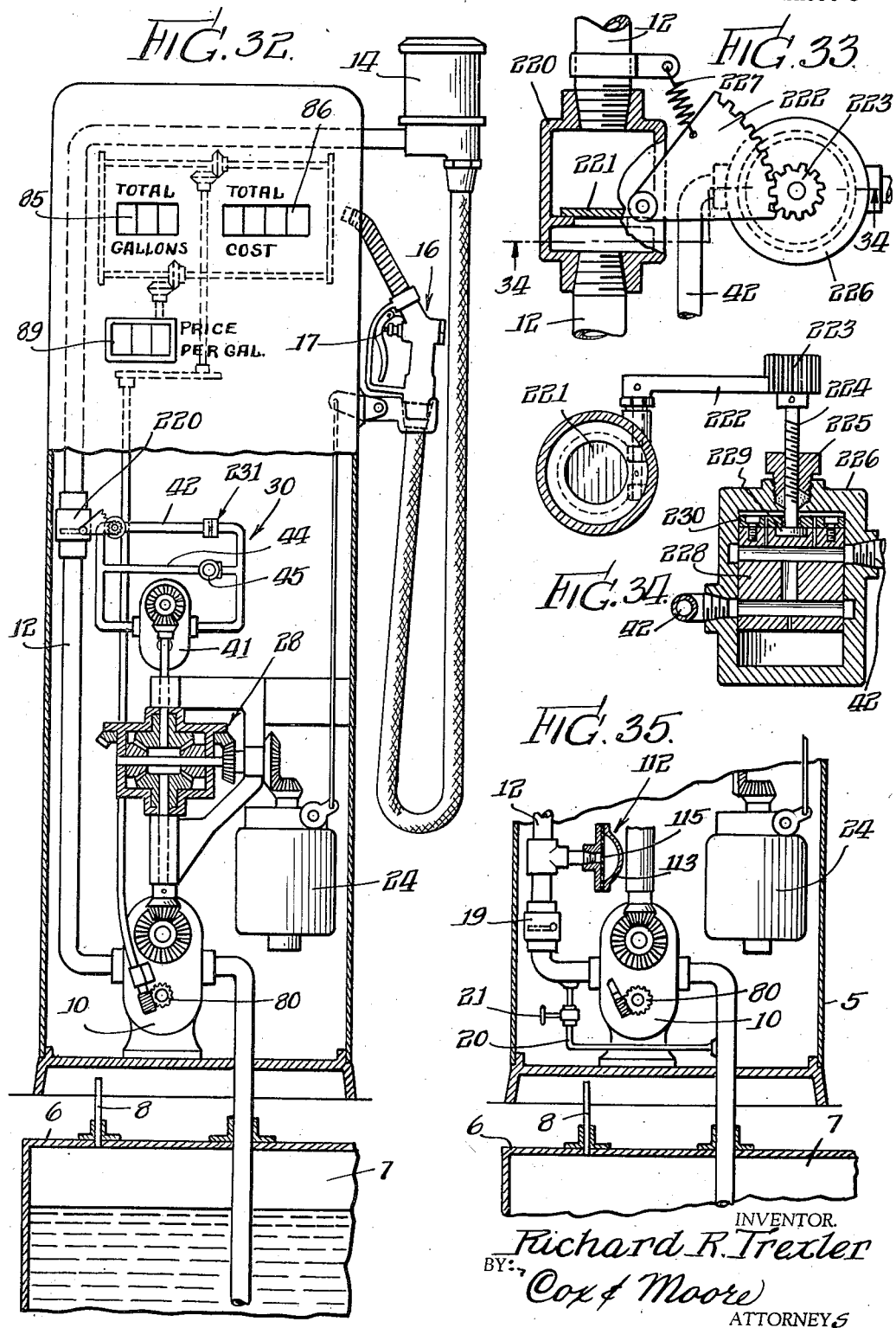

Dec. 4, 1945.　　　R. R. TREXLER　　　2,390,136
LIQUID DISPENSING APPARATUS
Filed April 18, 1939　　　12 Sheets-Sheet 9
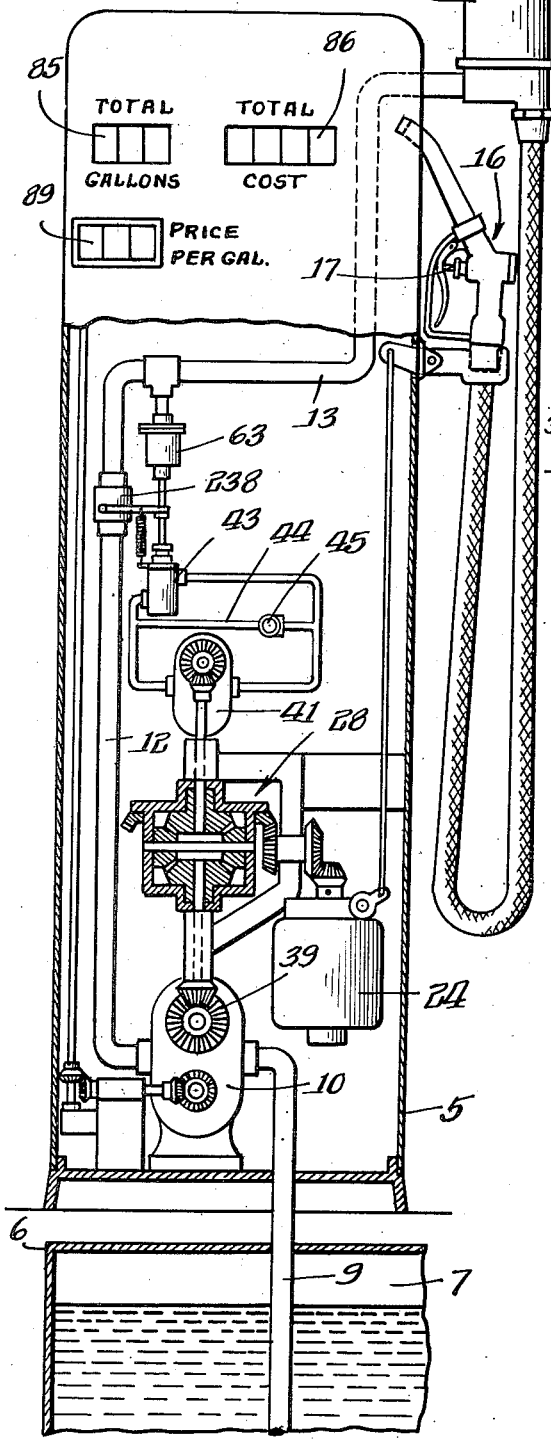
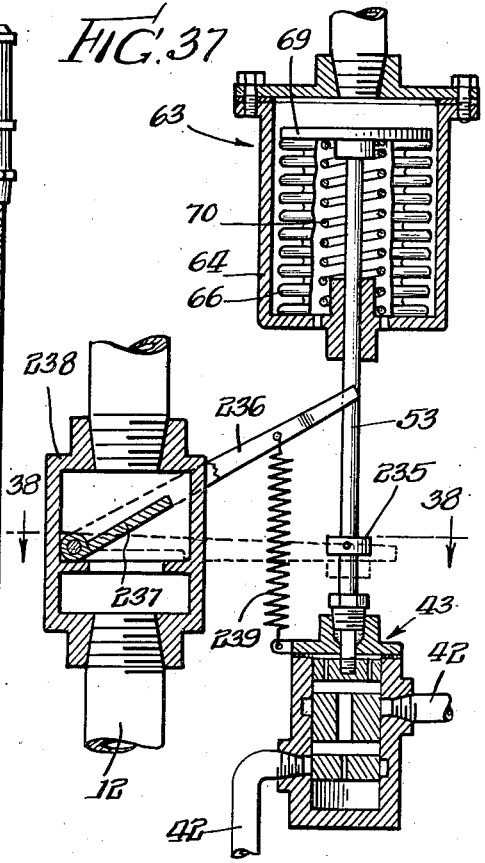
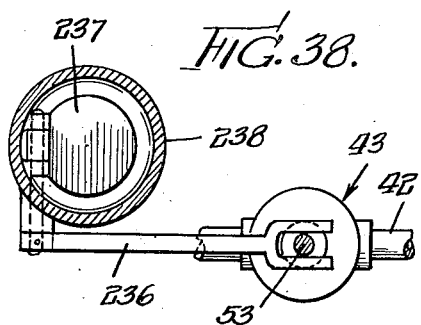
INVENTOR.
Richard R. Trexler
BY: Cox & Moore
ATTORNEYS.

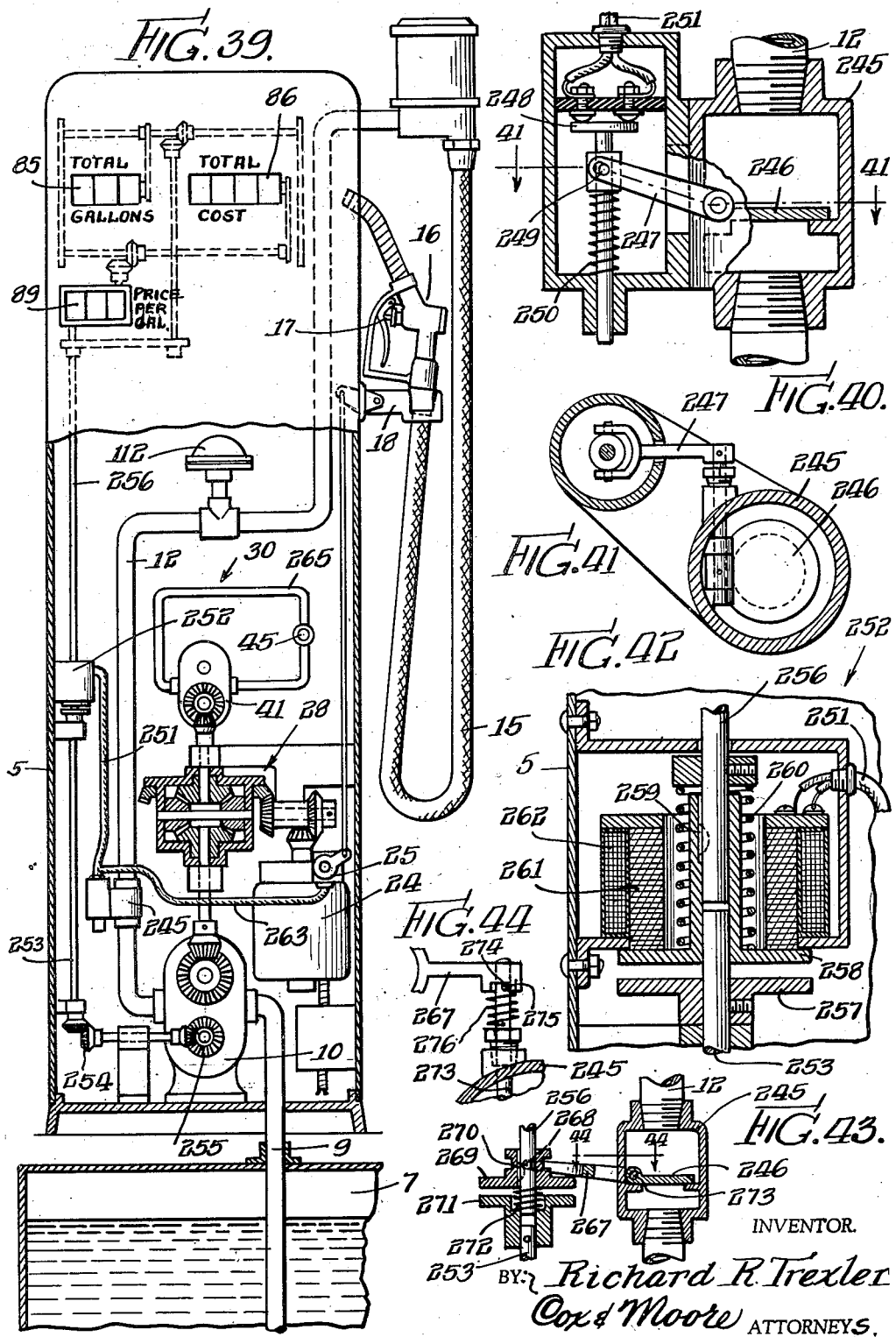

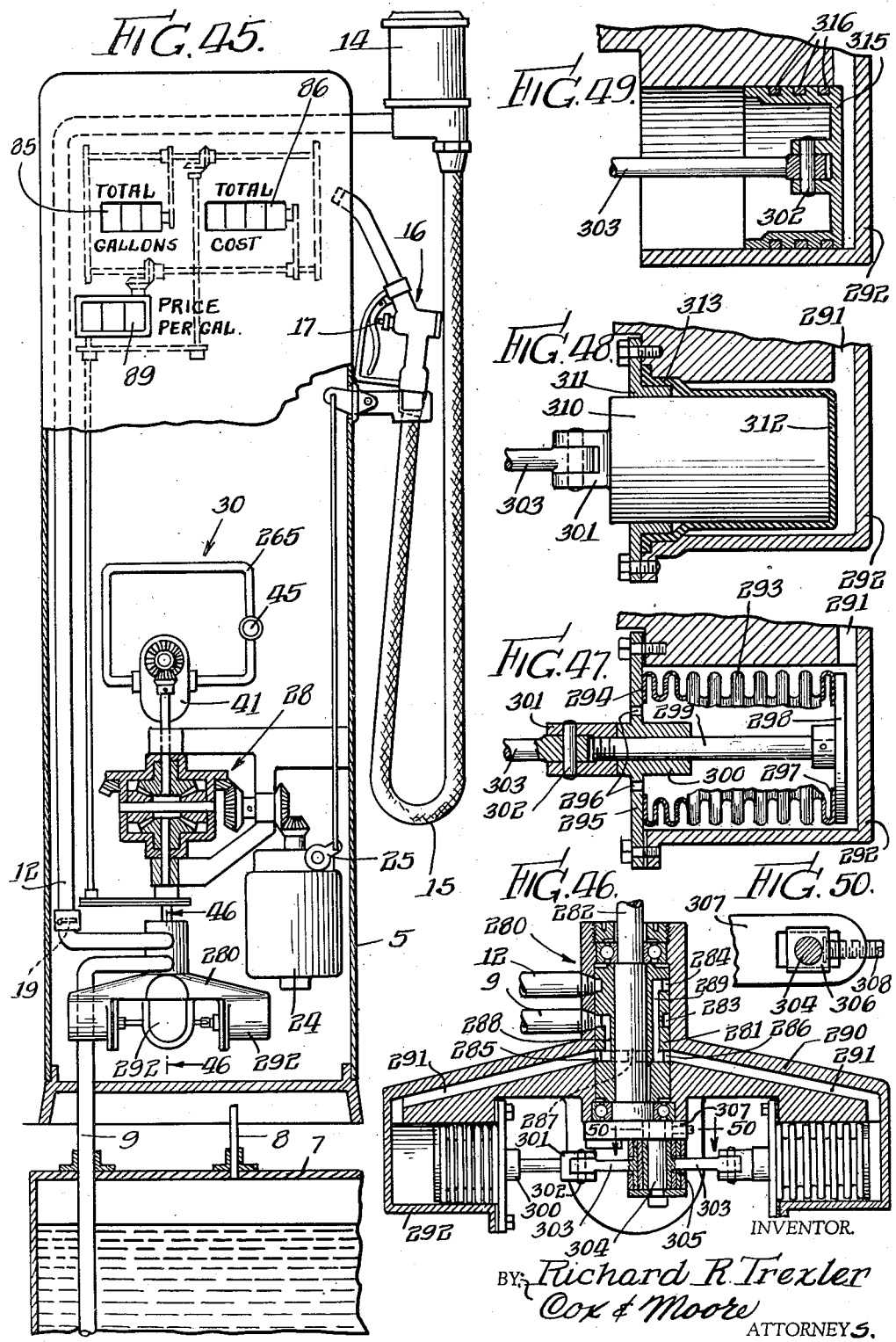

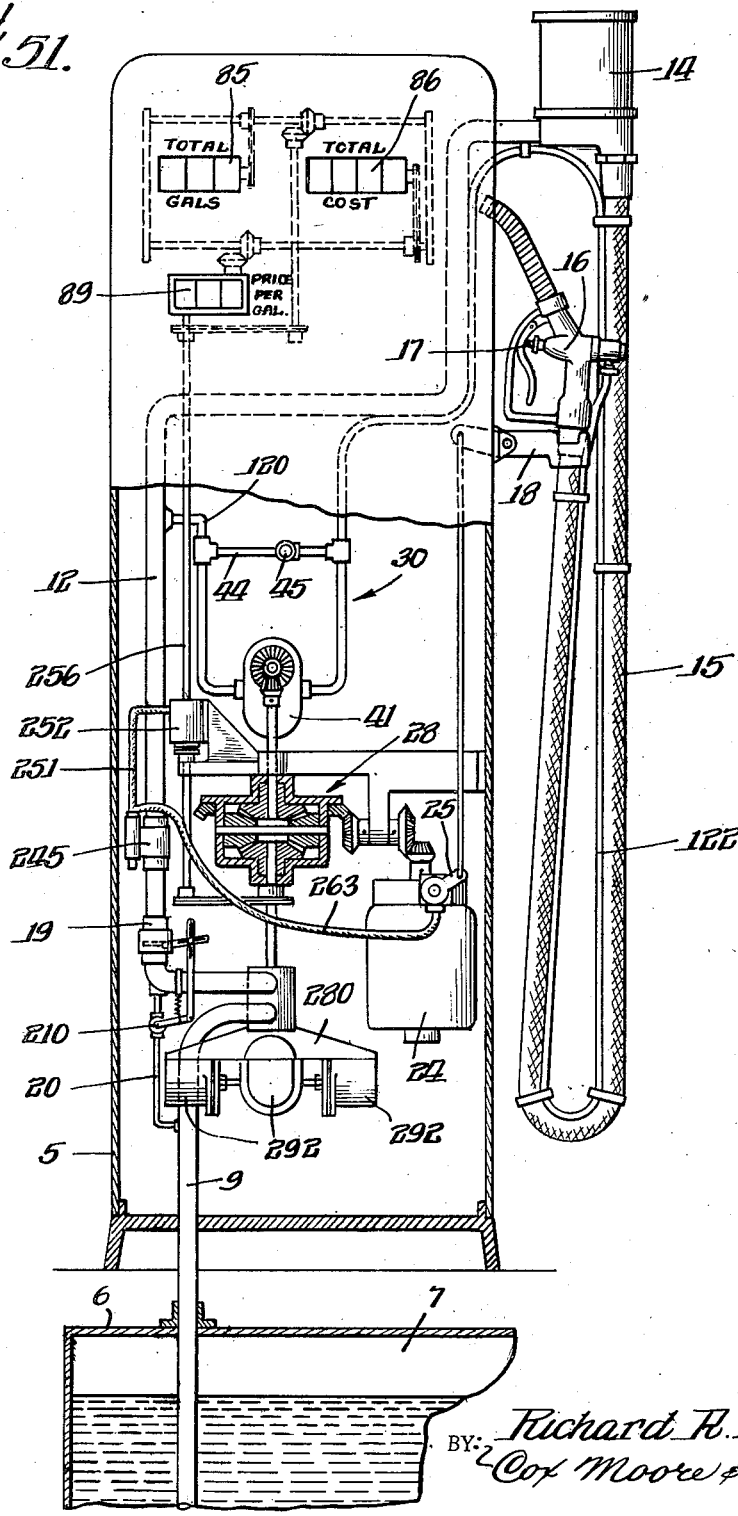

Patented Dec. 4, 1945

2,390,136

UNITED STATES PATENT OFFICE 2,390,136

LIQUID DISPENSING APPARATUS

Richard R. Trexler, Evanston, Ill.

Application April 18, 1939, Serial No. 268,551

22 Claims. (Cl. 222—36)

This invention relates to liquid dispensing apparatus, and more particularly to apparatus of the type adapted to dispense gasoline or the like.

It is an object of the invention to provide improved liquid dispensing apparatus of the type wherein the movements of the liquid propelling pump may be made directly proportional to the actual liquid flow within the dispensing line whereby the pump itself may be used to actuate the register mechanism or other recording or indicating elements of the apparatus, meter mechanisms or the like being eliminated. In accordance with the invention the liquid propelling pump for propelling liquid through the dispensing line is operated from a constantly operating power source, such as an electric motor; and instantaneously operable and readily controllable means is provided for instantaneously diverting from the pump all or any predetermined amount of the motor power when it is desired to reduce the pump speed or stop the pump during dispensing operations. By this means the movements of the liquid propelling pump are rendered accurately proportional to the flow of liquid propelled thereby, whether the pump be operated at full speed, part speed, or intermittently.

More specifically, one of the objects of the invention contemplates the provision of improved means for controlling the power diverting mechanism which diverts the power between the power source and the dispensing pump, whereby to insure a total diverting of power, a partial diverting of power, or no diverting of power as may be required.

A further object of the invention is to provide an improved form of power diverting mechanism, readily adapting itself to various types of control.

Another object of the invention is to provide means for absorbing shock to the column of liquid within the dispensing line upon the stopping of the dispensing flow.

Another object of the invention is to provide, in liquid dispensing apparatus of the type above set forth, improved and readily controllable means for causing the dispensing of liquid at partial rates of flow.

Another object of the invention is to provide improved by-pass means for by-passing liquid from the outlet back to the inlet side of the dispensing pump whereby to calibrate the same. In one form of the invention the by-pass means is operable only during operation of the pump, and proportional to pump displacement.

Another object of the invention is to provide in liquid dispensing apparatus of the type stated, means for disconnecting the register or other indicating or recording mechanism from the pump when liquid is not being dispensed, whereby to insure accuracy of the registering, indicating or recording means.

A still further object of the invention is to provide in dispensing apparatus of the type above set forth, improved forms of pumping means in which the slippage factor is reduced or eliminated whereby to simplify the required form of power diverting mechanism.

Still further objects, advantages and features of the invention will be apparent from the following specification when taken in connection with the accompanying drawings wherein certain preferred embodiments and modifications of the invention are illustrated.

In the drawings, wherein like reference numerals refer to like parts throughout:

Fig. 1 is a general assembly view, partly in section, of a liquid dispensing apparatus constructed in accordance with one form of the invention.

Fig. 2 is a partial detail view of the by-pass valve for the power diverting mechanism, taken on the line 2—2 of Fig. 1.

Fig. 3 is a partial detail view of the control valve operating means for the diverting mechanism.

Fig. 4 is a detail sectional view of a preferred form of control valve, as used in the embodiment of the invention illustrated in Fig. 1.

Fig. 5 illustrates a modified form of control valve operating means omitting the toggle mechanism for insuring the full opening of the control valve.

Fig. 6 illustrates a modified form of control valve.

Fig. 7 is a general assembly view showing an electrical form of control valve operating means.

Fig. 8 is a partial detail view of the mechanism shown in Fig. 7.

Fig. 9 illustrates a modified form of electrical control.

Fig. 10 is a detail view of the control means shown in Fig. 9.

Fig. 11 illustrates a form of the invention wherein the control valve for the power diverting means is arranged at the dispensing nozzle.

Fig. 12 is a detail view of the control valve and associated nozzle construction as used in the embodiment of the invention shown in Fig. 11.

Fig. 13 is a sectional view of the mechanism of Fig. 12 taken on the line 13—13 thereof.

Fig. 14 illustrates a modified form of control valve and nozzle assembly.

Fig. 15 is a view similar to Fig. 12 illustrating a generally similar form of mechanism, but wherein the nozzle valve for the dispensing line is eliminated.

Fig. 16 illustrates a form of the invention generally similar to that shown in Fig. 11, but employing a modified form of control circuit for the power diverting mechanism.

Fig. 17 is a detail view of the nozzle assembly and associated control valve as used in the mechanism shown in Fig. 16.

Fig. 18 is a sectional view of the structure shown in Fig. 17, taken on the line 18—18 thereof.

Fig. 19 is a detail view of the valve mechanism for controlling the by-pass means for the dispensing pump, in accordance with one form of the invention.

Fig. 20 illustrates a form of the invention wherein a Bowden wire or the like is used for operating the control valve for the power diverting mechanism.

Fig. 21 is a detail view of the nozzle valve and associated parts as used in the form of invention shown in Fig. 20.

Figs. 22, 23 and 24 are views generally similar to Fig. 21, but illustrating modified forms of nozzle constructions.

Fig. 25 shows a form of control valve particularly adapted for use with the type of nozzle construction shown in Fig. 24.

Fig. 26 is a view illustrating a form of the invention wherein a fluid pressure line leading from the dispensing nozzle is utilized for operating the control valve for the power diverting mechanism.

Fig. 27 is a detail view illustrating the nozzle construction and associated parts as embodied in the structure of Fig. 26.

Fig. 28 illustrates a form of the invention wherein the control valve for the power diverting mechanism is controlled conjointly by dispensing line pressure and a nozzle-operated Bowden wire.

Fig. 29 is a detail view of the operating mechanism for the construction shown in Fig. 28.

Fig. 30 is a detail view of the dispensing pump by-pass means as embodied in the construction shown in Fig. 28.

Fig. 31 is a detail sectional view of the by-pass valve taken on the line 31—31 of Fig. 30.

Fig. 32 illustrates a form of the invention wherein the control valve for the power diverting mechanism is controlled by the volume of liquid flow within the dispensing line.

Figs. 33 and 34 are detail views of the control mechanism as embodied in the structure of Fig. 32, Fig. 34 being taken on the line 34—34 of Fig. 33.

Fig. 35 is a partial detail view of the structure shown in Fig. 32, but modified to include dispensing line surge absorbing means.

Fig. 36 illustrates a form of the invention wherein the control valve for the power diverting mechanism is conjointly operated by the volume of flow and the pressure conditions within the dispensing line.

Figs. 37 and 38 are detail views of the operating mechanism embodied in the Fig. 36 structure, Fig. 38 being taken on the line 38—38 of Fig. 37.

Fig. 39 illustrates a form of the invention wherein means is provided for disconnecting the register mechanism from the dispensing pump when no liquid is being dispensed.

Figs. 40 and 41 are detail views of the control mechanism for the disconnecting means, Fig. 41 being taken on the line 41—41 of Fig. 40.

Fig. 42 is a detail view of the disconnecting mechanism as embodied in the structure of Fig. 39.

Figs. 43 and 44 are detail views illustrating a modified form of disconnecting means, Fig. 44 being taken on the line 44—44 of Fig. 43.

Fig. 45 illustrates a form of the invention embodying improved dispensing pumping means and a simplified form of control for the power diverting mechanism.

Fig. 46 is a detail view of the pumping means shown in Fig. 45 and taken on the line 46—46 thereof.

Fig. 47 is a detail view illustrating the cylinder structure of the pumping means.

Figs. 48 and 49 illustrate modified forms of cylinder structure.

Fig. 50 is a detail view of the adjusting means which may be used for adjusting the pump displacement, taken on the line 50—50 of Fig. 46, and Fig. 51 is a general assembly view illustrating a form of apparatus embodying the control means of Figs. 11, 12 and 13, but including a pump by-pass structure as shown in Figs. 28, 30 and 31, a register disconnecting mechanism as shown in Figs. 39 to 42 inclusive, and a form of pump structure as illustrated in Figs. 45, 46, 47 and 50.

This application is a continuation-in-part of my copending application Serial No. 237,593, filed October 29, 1938, now issued as Patent No. 2,239,207, dated April 22, 1941.

Referring first to Figs. 1 to 4 inclusive, and Fig. 19, the embodiment of the invention illustrated comprises a dispensing apparatus housing 5 associated with an underground tank or reservoir 6 adapted to receive the liquid to be dispensed. In the particular embodiment illustrated this liquid, which is indicated by the reference numeral 7, may be gasoline or the like. The tank is provided with an inlet pipe, not shown, closed by the usual cap, by means of which the gasoline is introduced into the underground tank. The tank is also provided with an air release pipe 8.

An outlet pipe 9 leads from the tank, from a point near the bottom thereof, to the inlet side of a main liquid propelling pump 10, which may in this instance be some suitable form of accurate gear pump. The outlet side of the pump is connected to a dispensing line 11, 12, 13 which leads to a sight glass or other suitable flow indicator 14. The outlet side of the sight glass is connected to a flexible hose 15 which terminates in a dispensing nozzle 16 controlled by a hand operated valve 17 in the usual manner. The dispensing nozzle is adapted to be supported upon a hose hook 18 when not in use, as shown in Fig. 1. A check valve 19 is provided in the dispensing line between pipes 11 and 12, and a by-pass or bleeder line 20 controlled by an adjustable valve 21 leads around the pump as shown.

The liquid propelling or dispensing pump 10 is adapted to be driven by an electric motor 24 controlled by means of switch mechanism 25. This switch mechanism may be operated by means of operating devices 26 and 27 associated with the hose support 18 in the usual manner. The electric motor is adapted to operate constantly during the entire dispensing operation, after the dispensing nozzle has been removed from the hose hook and until it is returned thereto, whereas the dispensing pump is adapted to operate only while liquid is actually being dispensed and at such speed as will give the proper rate of liquid flow. To this end the motor is arranged to drive the pump through a power diverting mechanism which comprises a differential gearing 28 supported by a suitable support bracket 29, and an associated control circuit 30 operated by the differential gearing and controlled by the liquid pressure in the dispensing line 12, 13. More specifically, the electric motor drives the main ring gear 31 of the differential by means of suitable beveled gearing 32 and 33. Ring gear 31 is secured to the housing of the differential and rotates therewith. The housing carries a stub shaft 34 upon which the differential gears 35 are mounted, in mesh with the side gears 37. The lower side gear is secured to a shaft which is adapted, by means of gearing 39, to drive the main dispensing pump 10, whereas the upper side gear is secured to a shaft adapted, by means of gearing 40, to drive an auxiliary gear pump 41. It will be seen that by means of the differential gearing, the electric motor 24 may operate either the main dispensing pump 10 or the auxiliary pump 41, or both. Obviously other suitable forms of differential gearings, such as planetary differential gearings, may be substituted for the form of gearing specifically shown.

The auxiliary gear pump, which may be any form of inexpensive gear pump and preferably smaller than the dispensing pump 10, is arranged to circulate liquid in the control circuit 30. This control circuit comprises a main pipe or conduit 42 controlled by a control valve 43, and a by-pass pipe 44 controlled by a by-pass valve 45. When the control valve 43 is open, the auxiliary pump is free to circulate the liquid within the control circuit, but when the control valve is closed, the auxiliary pump is locked against operation. The by-pass valve 45 is a spring controlled relief valve and is adapted to be adjusted so that a small amount of the liquid will be passed therethrough in the event the control valve 43 is quickly closed when the auxiliary pump is operating, to thereby absorb the shock of the locking operation.

The by-pass valve is illustrated in detail in Fig. 2, and the control valve and its operating mechanism is shown in Figs. 3 and 4. Referring first to Fig. 2, the by-pass valve 45 comprises a housing 46 carrying a valve seat 47 against which a ball 48 is adapted to be urged by means of a compression spring 49. The tension in the spring, and consequently the pressure at which the by-pass valve may be set to open, is adjustable by means of an adjusting screw 50 which is adapted to adjust the length of the compression spring from its upper end.

As seen in Figs. 3 and 4, the control valve 43 preferably comprises a valve casing 51 having a cylindrical central chamber adapted to receive a cylindrical valve core member 52. The core member is slidable within the cylindrical chamber under the control of an upstanding stem 53 which is threadedly secured to the core member and adapted to be operated by operating mechanism later to be described. The valve casing is provided with annular channels 54 and 55 in communication with the pipes 42 of the control circuit, and the core member is provided with passageways 56 and 57 in communication with the channels, and with a passageway 58 connecting the passageways 56 and 57. When the core member is in the position shown in Fig. 4, free liquid communication is provided between the pipes 42, by means of the core passageways 56, 57 and 58, but when the core member is raised to bring the passageways 56 and 57 above the casing channels 54 and 55 communication is cut off. If the core member is partly raised, part communication between pipes 42 will be maintained. By reason of the annular channels 54 and 55, the fluid pressure upon the sides of the core member is balanced at all times so that there is no resultant side thrust of the core member against the valve casing. Accordingly the core member is freely operable at all times. Passageways 59 and 60 lead from the passageways 56 and 57 to the chambers formed within the valve casing at the ends of the core member to prevent liquid locking of the core member. A packing nut 61 prevents leakage of liquid outwardly from the valve along the stem 53.

The mechanism for operating the control valve, as best shown in Fig. 3, comprises a pressure device 63 responsive to the pressure in the dispensing line 12, 13. Specifically this pressure responsive device comprises a casing 64 attached to and communicating with a pipe 65 leading from the dispensing line. Within the casing is a flexible bellows 66, which may be of any suitable construction. The bellows is secured, as by soldering or the like, at its lower end 67 to the casing 64, and at its upper end 68 to a plate member 69 attached to the valve operating rod 53 and arranged for sliding movement within a bearing formed in the lower end of the casing 64. A compression spring 70 surrounds shaft 53 and normally urges the shaft and the plate 69 upwardly. Openings 71 in the casing prevent air-lock of the bellows. As liquid pressure is introduced into the casing 64 by means of pipe 65, the bellows 66 will be collapsed against the force of spring 70 moving the valve control stem 53 downwardly to the Fig. 4 position, thus opening the control valve 43. A release of liquid pressure within casing 64 causes compression spring 70 to raise valve stem 53, thus closing the control valve 43.

As shown in Fig. 19, the valve 21 for controlling the by-pass line 20 around the dispensing pump may be any suitable form of adjustable needle valve and, as illustrated, comprises a valve casing 72 formed with chambers 73 and 74 communicating by means of a passage 75. A needle valve stem 76 threaded into a packing plug 77 and operable by means of a knob 78 adjustably controls the valve passageway 75.

The main liquid propelling or dispensing pump 10 is arranged to actuate the registering or recording elements of the apparatus by means of a gearing 80 driven by the pump, and a flexible shaft 81. By means of driving connections 82, 83 and 84 the shaft 81 is adapted to operate a volume register 85. The shaft 81 is also adapted to operate a total price or cost register 86 by means of driving connections 87 and 88. Interposed between the shaft 81 and the gearing 87 is a suitable variator mechanism 89 by which the gear ratio between the shaft and the cost register 86 may be changed whereby to compute the cost of the dispensed gasoline at different unit prices. This variator mechanism may be any suitable form of change speed gearing. The registers and their operating parts may likewise be of any suitable desired type, for example, of the type shown in the patent to E. J. Svenson, for Liquid handling mechanism, Patent No. 2,117,750, dated May 17, 1938.

In operation, the liquid to be dispensed, as gasoline, is introduced into the underground storage tank or reservoir by means of the usual filling pipe. During this operation the displaced air within the tank is exhausted through the air release pipe 8 exhausting underneath the dispensing apparatus. To effect a dispensing operation, the operator removes the dispensing nozzle from the hose hook 18 and manipulates switch 25 to start the electric motor 24 which thereafter runs constantly during the dispensing operation. As a result of the previous dispensing operation, fluid pressure has been built up in the dispensing line 12, 13. This fluid pressure maintains the bellows 66 collapsed against the pressure of spring 70 so that the control valve 43 is open. Accordingly as the motor 24 is started and while the nozzle valve 17 still remains closed, auxiliary pump 41 is operated through the differential mechanism, and the main dispensing pump 10 remains stationary. The auxiliary pump circulates the liquid in the closed circuit through the open valve 43. The valve being in fully open position, there is no impedance to the flow of the liquid within the closed circuit, and no driving force or drag is transmitted back through the differential to the dispensing pump 10. In other words, even though the motor 24 is operating, no driving force is transmitted to the dispensing pump.

As the operator now opens the nozzle valve 17 to dispense liquid, the pressure within the dispensing line 12, 13 is relieved. This causes the relief of the fluid pressure within the casing 64 of the pressure responsive device 63, and the compression spring 70 operates to expand the bellows 66, closing control valve 43. As the control valve closes, the circulation of the liquid within the closed control circuit 30 is stopped. This locks the auxiliary pump 41 from operation and the driving force from the motor 24 is immediately transmitted to the dispensing pump 10. The dispensing pump operates and liquid is dispensed from the nozzle 16. In view of the fact that the control valve 43 may be closed rapidly by the relief of pressure within the dispensing line 12, 13, the by-pass valve 45 is provided to relieve the shock upon the pumps and the differential mechanism as the auxiliary pump is stopped. To this end the adjusting screw 50 of the by-pass valve is so set that a small quantity of the liquid may be circulated through the by-pass line 44 as the control valve 43 is first closed. The adjustment of screw 50 is such that circulation through by-pass line 44 is normally prevented, and the by-pass valve opens only for a very short time and only upon the rapid closing of control valve 43, to prevent any shock to the operating parts of the system.

When it is desired to cut off the flow of the dispensed liquid, the operator closes valve 17. This builds up pressure within the dispensing line 12, 13, causing the opening of control valve 43. The dispensing pump 10 stops and the auxiliary pump 41 begins its operation to circulate the liquid freely within the closed control circuit. The operator may open or close the nozzle valve 17 at will to accurately control the quantity of liquid dispensed, and each time as the nozzle valve is closed, the driving force upon the dispensing pump 10 is immediately relieved by reason of the opening of control valve 43. Accordingly there is no tendency to drive the dispensing pump after the flow of the dispensed liquid has been stopped by the nozzle valve. Accuracy is assured and maintained.

Should the operator desire to dispense liquid at some fractional rate of flow, he closes nozzle valve 17 partially. This causes a partial building up of pressure within the dispensing line 12, 13, resulting in a partial operation of the pressure control device 63 and in a partial opening of control valve 43. Under these circumstances, therefore, both pumps 10 and 41 will be operated at reduced speed from the power source or motor 24. Equilibrium within the system is always maintained, and the rate of liquid flow from the dispensing nozzle will be proportional to the degree of opening of the nozzle valve. The tension of spring 70 is such that the bellows will not be collapsed by normal dispensing pressures in the line 12, 13, as when the nozzle valve is fully opened. However, if the nozzle valve is partially closed, a pressure slightly above normal is produced in the dispensing line, and this increased pressure causes the partial opening of control valve 43. The adjustment of the parts may be accurately controlled in view of the fact that the control valve 43 is freely operable at all times and not influenced by pressure conditions within the control circuit 30. During fractional rate dispensing flow, the pressures within the dispensing line are built up only very slightly above normal. Accordingly the dispensing pump 10 operates against a substantially constant pressure at all rates of delivery, to further maintain and assure accuracy. Inasmuch as the movements of the dispensing pump 10 are thus maintained accurately proportional to the actual volume of liquid dispensed, whether the flow be at full rate, fractional rate or intermittent, the dispensing pump may be directly connected to the register devices of the apparatus. Metering mechanisms or devices are eliminated.

When the dispensing operation is completed, the operator restores the dispensing nozzle to the hose hook 18 and shuts off the electric motor.

The check valve 19 prevents reverse flow within the dispensing line and insures the maintenance of pressure within pipes 12 and 13 after the dispensing pump is stopped. The by-pass line 20, which leads around the dispensing pump from the outlet to the inlet side thereof, is provided for calibrating the pump for accuracy, the amount of liquid which is by-passed through the line 20 during operation of the pump being accurately controllable by the valve 21. It is to be understood that the by-pass line 20 is merely a calibrating means and may be eliminated if the calibration of the pump is unnecessary or the pump structure includes calibrating means for providing variable displacement.

It is further to be understood that while no air release mechanism has been illustrated, suitable air release means arranged on the inlet side of the pump is contemplated and may be used, if desired. Various forms of air release means may be used, for example the type shown in my copending application Serial No. 251,121, filed January 16, 1939, or in the copending application of James Ballard Moore and Richard R. Trexler Serial No. 248,378, filed December 30, 1938.

Preferably the mechanism also includes means for insuring the full opening of the control valve for the power diverting mechanism as liquid pressure is built up to a predetermined point within the dispensing line 12, 13 whereby to insure the complete unloading of the control circuit at the end of the dispensing operation. To this end the rod or stem 53 for operating the control valve is pivotally connected, as indicated at 90, with a toggle mechanism comprising a pair of toggle links 91 connected by a tension spring 92, the outer ends of the links being guided in their movements by a slotted, fixed guide bar 93. It will be seen that as the stem 53 is propelled downwardly upon the building up of pressure within the pressure device 63, as the stem reaches a predetermined position, the toggle links 91 will snap past dead center tending to assume their dotted line position and insuring full downward or opening movement of the valve stem. In other words, after the toggle links pass dead center, the tension of spring 92 aids the liquid pressure within casing 64 to insure full valve opening. However, as the liquid pressure within casing 64 is released upon the opening of the nozzle valve 17, the spring 92 is not sufficiently strong to resist spring 70 causing upward movement of valve stem 53 to close the control valve.

In Fig. 5 a control arrangement is illustrated omitting the toggle mechanism.

In Fig. 6 an embodiment is illustrated wherein the control valve for the control circuit 30 of the power diverting mechanism is of the type which is influenced by the liquid pressure within the control circuit pipe 42. In this instance the valve comprises a casing 95 provided with chambers 96 and 97. A valve member 98 having its stem threaded into a plug 99 is arranged for controlling the communication through the valve between chambers 96 and 97. The valve stem may be operated by means of a gear 100 in mesh with rack teeth 101 provided upon the stem or shaft 53 of the pressure device 63. If the upper pipe 42 is the inlet pipe to the valve casing, the valve member 98 must be closed against the liquid pressure within the control circuit 30. On the other hand if the lower pipe 42 is the inlet to the valve casing, the liquid pressure within the control circuit tends to close valve member 98. A control valve of this type, which is influenced by the liquid pressure within the control circuit as distinguished from the type of control valve shown in Fig. 4, may in certain installations be desired.

In Figs. 7 and 8 an embodiment of the invention is illustrated which is generally similar to that previously described except that the control valve for the control circuit of the power diverting mechanism is electrically operated, and means may be provided in the dispensing line for absorbing the surge or shock of the liquid as the liquid flow is rapidly stopped.

In this instance the pressure device 63 controls a switch 105 which in turn controls an electromagnet 106 for operating the control valve which may be of any suitable form and as illustrated is adapted for rack operation. To this end the valve is provided with a gear 107 adapted to be operated by a rack 108 provided on the core 109 of the electromagnet. As best shown in Fig. 8, a compression spring 110 embraces the magnet core 109 and normally urges the core downwardly into the position shown in Figs. 7 and 8, in which position valve 43 will be open.

In the operation of this form of the invention when pressure exists within the dispensing line 12, 13 and within the pressure device 63, switch 105 is open and no current is transmitted to the electromagnet 106. Accordingly the compression spring 110 holds the control valve 95 in open position. However, when pressure within the dispensing line 12, 13 is relieved by the opening of the nozzle valve, switch 105 closes causing the electromagnet 106 to raise its core 109 closing the control valve 95 and applying driving power from the motor 24 to the dispensing pump 10. The wires 111 for conducting current to the electromagnet may also be under the control of motor switch 25 as shown in Fig. 7 so that the electromagnet can be energized only after the nozzle support 18 has been raised to start the motor 24 and effect a dispensing operation. If the control valve is of the type shown in Fig. 6, such as valve 95, and wherein liquid pressure within the control circuit 30 tends to open the valve, then the power of the electromagnet may be so proportioned to the liquid pressure exerted upon the valve that the valve can be held partially open by the liquid pressure even when the electromagnet is energized, thereby permitting partial rate dispensing with the electromagnet in energized condition.

The surge absorbing device indicated at 112 is shown in section in Fig. 16. It may comprise an air-filled dome member 113 connected to the dispensing line by means of a pipe 114. A flexible diaphragm of rubber or the like 115 separates the dome from the liquid within pipe 114, but as pressure builds up within the dispensing line, the flexible diaphragm will expand into the dome compressing the air therein. The dome thus acts as a surge chamber for absorbing liquid pressure shocks within the dispensing line.

In Figs. 9 and 10 an arrangement is shown for operating the control valve of the control circuit conjointly by mechanical and electrical means. In this instance a control valve 43 of the type shown in Fig. 4 is preferably used, but the valve stem 53 is extended downwardly through the valve, forming the core of an electromagnet 117. Valve stem 53 is also provided with a switch contactor 118 adapted to engage switch contacts 119 for controlling the current to the electromagnet.

In operation when liquid is being dispensed and there is no build up of pressure within the dispensing line 12, 13 and within the pressure device 63, valve stem 53 will be in its raised position holding control valve 43 closed. As the nozzle valve is closed and pressure builds up within the dispensing line, valve stem 53 will be moved downwardly opening control valve 43. At a predetermined position during this opening movement switch contacts 118, 119 will be closed and electromagnet 117 will be energized, and as the electromagnet is energized the valve stem core 53 will be pulled downwardly the full extent of its movement insuring the complete opening of the valve. The switch contacts 119 are sufficiently flexible to allow for the movement of contactor 118 after the closing of the switch. In this form of the invention it will be seen that the control valve is primarily mechanically under the control of the pressure device 63, but the electrical means is provided, similar to the toggle mechanism described with reference to Fig. 5, for insuring the complete opening of the control valve as the nozzle valve in the dispensing line is closed. When the nozzle valve is opened and pressure within the dispensing line is relieved, the electromagnet 117 does not have sufficient strength to resist the raising of the valve stem 53 by the spring 70 within the pressure device.

In Figs. 11, 12 and 13 an embodiment of the invention is illustrated wherein the control circuit for the power diverting mechanism is extended outwardly to the dispensing line nozzle, and the control valve for the control circuit is formed at the nozzle as a part thereof. In this instance the control circuit 30 comprises a pipe 120 leading from the dispensing line 12 to the auxiliary pump 41. A pipe conduit 121 leads from the pump outwardly along the dispensing line terminating at the dispensing nozzle, the outer portion of the conduit as indicated at 122 being constructed of flexible tubing and secured to the dispensing hose as shown. A by-pass pipe 44 and spring pressed relief valve 45 form a by-pass between pipes 120 and 121 as in the previously described embodiments of the invention.

Fig. 14 illustrates a modified form of nozzle construction, as compared with that shown in Figs. 12 and 13, which nozzle construction is also usable with the form of control circuit illustrated in Fig. 11. Inasmuch as the nozzle structure of Fig. 14 is of the simpler construction, its structure and mode of operation will be first described. In Fig. 14 the dispensing nozzle 16 comprises the usual nozzle valve 123 normally urged into closed position by compression spring 124 and adapted to be opened by the valve stem 125 operable by lever 126. In accordance with the invention the upper end of stem 125 is threadedly secured to a cylindrical valve core member 127 slidable within a valve casing member 128 formed as a part of the nozzle structure, the valve member 127 being adapted to control the flow of liquid from the conduit 122. To this end the casing 128 is provided with an annular channel 129 communicating with conduit 122, and the valve core 127 is provided with passages 130 adapted to connect the channel with main chamber 131 of the nozzle. Valve core 127 is also provided with passages 132 connecting with the chamber formed at the end of the valve to prevent fluid-lock thereof. A non-drain valve 134 urged into closed position by a light compression spring 135 may be provided in the nozzle assembly on the outlet side of the nozzle valve 123.

In the operation of this form of construction as the motor 24 is started, and before the actuation of the nozzle lever 126 auxiliary pump 41 will be operated and the main dispensing pump 10 will remain stationary. Liquid will be drawn from the dispensing line 12 by the auxiliary pump through pipe 120 and discharged by conduit 121 back into the dispensing line at the nozzle end thereof. At this time control valve 127 and nozzle valve 123 are in the position shown in Fig. 14 permitting the free discharge of liquid from conduit 122 into the dispensing line, but preventing the delivery of liquid from the spout 16a of the nozzle. During this operation of the parts the hose line 15 and the dispensing line 12 act as the return line for the control circuit 30, no gasoline is being dispensed and there is no actuation either of the dispensing pump 10 or the register mechanism. As dispensing lever 126 is now operated, nozzle valve 123 will be opened, and dispensing of gasoline will take place when control valve 127 has been sufficiently closed to cause a building up of pressure within the differential mechanism, which pressure starts the main dispensing pump 10, causing gasoline to be dispensed through the open nozzle valve 123 and overcoming the non-drain valve 134. Liquid may be dispensed at full or partial rates of flow, the arrangement being such that valve 123 is open when valve 127 is closed and vice versa, both valves being partly open to dispense at partial rates of flow. The annular channel 129 and the bleed passages 132 insure free operation of the control valve 127 at all times and under all pressure conditions.

Referring now to Figs. 12 and 13, in this preferred form of structure the mechanism is particularly adapted for dispensing at partial rates of flow. In this instance the dispensing valve for controlling the dispensing flow consists of two parts, an inner part 137 secured to the valve stem 125, and an outer part 138 loosely mounted on the valve stem and adapted to be opened when the projecting portion 139 thereof is engaged by a shoulder 140 provided on stem 125. A compression spring 141 urges the outer valve part 138 into closed position, and a second compression spring 142 urges the valve stem 125 and the inner valve 137 into closed position. The control valve 127 is provided with two sets of passageways 143 and 144 in communication with the channel 129, passageways 143 being larger than passageways 144.

In operation nozzle lever 126 may be partially operated to cause the partial shifting of valve stem 125 to effect partial rate dispensing, or fully operated to effect full rate dispensing. The partial shifting of valve stem 125 opens the inner dispensing valve 137 and cuts off communication of control valve passageways 143 with the channel 129. Passageways 144 remain in communication with the channel permitting partial operation of auxiliary pump 41. The complete shifting of valve stem 125 opens both valves 137 and 138 and completely closes the control valve 127. By proper proportioning the size of valves 137 and 138 with respect to passageways 143 and 144, the pressure against which the dispensing pump 10 will be pumping at partial and full rates of delivery may be controlled and equalized for accuracy.

In Fig. 15 an arrangement is shown substantially similar to that illustrated in Figs. 12 and 13, but wherein the nozzle valve is eliminated, the non-drain valve 134 being relied upon to prevent inadvertent dispensing of liquid. The control valve 127 is provided with large and small passageways 143 and 144 as before, adapting it for partial flow control. A compression spring 145 urges the valve stem into the position shown in Fig. 15. When the control valve 127 is in the position shown in Fig. 15, the auxiliary pump 41 is free to operate and no power is transmitted to the dispensing pump 10. The non-drain valve 134 will prevent inadvertent dispensing of liquid even though no nozzle valve is provided. As the valve stem 125 is actuated, partial or full rate dispensing will be effected in the manner previously described, the movements of the main dispensing pump 10 being entirely controlled from the control valve 127.

In Figs. 16, 17 and 18 an embodiment is illustrated generally similar to that shown in Fig. 11 except that the liquid control circuit 30 is entirely independent of the dispensing line, permitting the use of liquid in the control circuit other than that which is being dispensed. In this instance the conduits 147 and 148 forming the inlet and outlet sides of the control circuit are both extended by means of flexible tubings 149 and 150 out to the dispensing nozzle. The control valve 127 operable by the nozzle valve stem 125 is provided with passages 151, 152 and 153 adapted to form communication between channels 154 and 155 connected to tubings 149 and 150 respectively. Packing 156 prevents leakage between the control circuit and the dispensing line. In this instance the non-drain valve 134 may be arranged on the approach side of the dispensing valve 123 as there is never any reverse flow in the dispensing line. The operation of this form of construction is believed to be clear from what has been previously set forth. It is obvious that partial rate control arrangements, as illustrated in Figs. 12, 13 and 15, may also be used with this form of control circuit.

Figs. 20 and 21 illustrate a form of the invention wherein a Bowden wire or the like may be utilized for actuating the control valve 43. As shown particularly in Fig. 21, the stem 53 of the control valve is adapted to be connected to a Bowden wire or the like 158 longitudinally slidable within a flexible sheath 159, the outer portion of the sheath being secured to the dispensing hose 15 for movement therewith. The nozzle end of the Bowden wire 158 is pivotally secured as indicated at 160 to a lever 161 rigidly fixed to nozzle valve operating lever 126. A compression spring 162 normally urges valve stem 53 downwardly.

In operation control valve 43 is normally open when nozzle valve 123 is closed, as stated, but as nozzle lever 126 is actuated to open the dispensing valve 123, the Bowden wire is simultaneously pulled against the force of spring 162 causing the closing of the control valve 43. Dispensing at partial rates of flow may be effected by moving the nozzle operating lever to a corresponding intermediate position.

In Figs. 22, 23, 24 and 25 modified forms of Bowden wire control are shown. In Fig. 22, an arrangement substantially similar to that shown in Fig. 21 is provided except that no nozzle valve is incorporated in the structure, the control valve 43 being solely relied upon to control the movements of the dispensing pump 10 as has been previously described. In Fig. 23 the arrangement is like that shown in Fig. 21 except that the nozzle valve 123 closes against the flow of liquid within the dispensing line, rather than with the flow. The valve stem 125 slides within a bearing 163 formed on a nozzle cap member 164, the stem normally being urged into closed position or to the left as seen in Fig. 23 by a compression spring 165. Stem 125 carries a pair of collars 166 and 167, valve 123 being loosely mounted on the stem and normally urged into engagement with collar 166 by a compression spring 168 which bears against the valve and against the collar 167. In operation, as valve stem 125 is moved to the right by actuation of lever 126, valve 123 will be opened in the usual manner by collar 166, but on the closing movement of the valve, valve 123 is free to separate momentarily from the collar 166, compressing the spring 168. The operation of the parts is otherwise the same as previously described. This form of nozzle valve which closes against the fluid flow, produces less shock in the fluid line upon valve closing. Obviously it can be used with any of the embodiments of the invention previously described, and is not limited to Bowden wire control.

Fig. 24 illustrates a double nozzle valve structure, similar to Fig. 12, adapted for Bowden wire control. The inner valve 170 is secured to the valve stem 125 and is normally urged into closed position by a spring 171. The outer valve 172 is loose on the valve stem and carries a projection 173 adapted to be engaged by shoulder 174 formed on the valve stem whereby the stem may open the valve. The outer valve is urged into closed position by a spring 175. As the valve stem 125 is shifted to the right, the inner valve 170 will first be opened, permitting partial flow, and thereafter the outer valve 172 will be opened, permitting full flow, as described in reference to Fig. 12.

Fig. 25 illustrates a form of control valve well adapted for use with the construction of Fig. 24. The valve is generally similar to that illustrated in Fig. 4 except that the passages in the valve core which communicate with the channels 54 and 55 comprise large passages 176 and small passages 177. The action of the valve is the same as described with reference to Fig. 13. Obviously this form of valve can be substituted for a valve such as shown in Fig. 4 wherever this may be desirable.

Figs. 26 and 27 illustrate an embodiment of the invention wherein a liquid pressure line, controllable from the dispensing nozzle, is utilized for operating the control valve 43. Referring particularly to Fig. 27, a flexible, liquid-containing conduit 180 is adapted to be secured to the dispensing hose 15 for movement therewith. The nozzle end of the conduit terminates within a bellows 181 arranged within a casing 182. The lower end of the bellows is secured to the casing in a fluid-tight connection as indicated at 183. The upper end of the bellows is secured in a fluid-tight connection to a plate 184 which acts as a piston within the casing 182, openings 185 preventing air-lock of the piston. Plate 184 is secured to a rod 186 pivotally connected to a bell-crank lever 187 mounted upon a pivot 188. A link 189 connects the bell-crank with a lever 190 fixed to the nozzle operating handle 126. The opposite end of the conduit 180 terminates within a casing 191. This casing carries a flexible bellows 192 secured at its upper end to a piston plate member 193 and at its lower end to the casing as indicated at 194. Plate member 193 is secured to the valve stem 53. A compression spring 195 normally urges plate 193 upwardly. In operation as nozzle actuating lever 126 is actuated to open nozzle valve 123, rod 186 will be simultaneously depressed by actuating linkage 190, 189 and 187. Downward movement of rod 186 causes the compression of bellows 181 forcing liquid through conduit 180 into the casing 191. The fluid pressure within casing 191 causes the collapse of bellows 192 forcing valve stem 53 downwardly. In this instance the control valve 43 will be so arranged that it is closed upon downward movement of the valve stem. As nozzle lever 126 is released and restored to normal position by its operating spring 196, compression spring 195 restores the bellows devices to the position shown in Fig. 27 opening the control valve.

In Figs. 28 to 31 inclusive a further arrangement of parts is shown. In this instance the control valve 43 is adapted to be operated conjointly by a nozzle actuated Bowden wire and by a pressure device 63 controlled from the liquid pressure within the dispensing line 12. As seen particularly in Figs. 28 and 29, the Bowden wire 200 operable within the flxible sheath 201 is arranged at its nozzle end for operation from the nozzle lever 126 in the manner previously described with reference to Figs. 20 and 21. The opposite end of the Bowden wire is secured to a lever 202 pivoted as indicated at 203 to a frame bracket 204. A tension spring 205 normally pulls the Bowden wire downwardly as seen in Fig. 29. The valve stem 53 is provided with a collar 206 adapted to be engaged by the lever 202, the upper end of the valve stem being connected with the pressure device 63 in the manner previously described with reference to Fig. 3.

In operation the control valve 43 is controlled from the pressure device 63 as described in connection with the embodiment of the invention shown in Figs. 1 to 4 inclusive, the valve stem 53 being lowered to open the control valve as pressure is built up in the dispensing line and raised to close the valve as the pressure within the dispensing line is relieved. When the nozzle valve is open, lever 202 will be raised completely free of collar 206 by the Bowden wire causing valve stem 53 to be under the control of the pressure device 63 as just described. However, as the nozzle valve is closed, spring 205 pulls the lever 202 downwardly into the position shown in Fig. 29 causing the lever to engage collar 206 and insure the full downward opening movement of the control valve 43. In other words, the control valve is primarily under the control of the pressure device 63, but the Bowden wire control provides additional means for insuring that the control valve will be completely opened at the end of the dispensing operation.

Referring to Figs. 28, 30 and 31, there is illustrated a modified form of by-pass or calibrating arrangement for the dispensing pump wherein the amount of liquid which is by-passed around the pump will be directly proportional to the volume of liquid dispensed. To this end the by-pass line 20 is provided with a valve 210 controlled from and in accordance with the movements of the check valve 19. The valve member 211 of check valve 19 is rigidly connected with an arm 212 pivotally connected to a link 213 which is in turn pivotally connected to a lever 214 secured to the stem 215 of the valve 210. The valve stem 215 is threaded into a plug 216, the arrangement being such that the valve stem may be operated by the arm 214 to open or close communication between the inlet and outlet valve chambers. A tension spring 217 normally urges lever 214 upwardly to close both the check valve 19 and the by-pass valve 210. However, during dispensing operations the check valve member 211 will be opened due to the liquid flow within the dispensing line causing the lowering of lever 214 and the opening of the by-pass valve 210. The greater the rate of flow within the dispensing line, the farther valve member 211 will open, and the greater will be the movement of lever 214 and the opening of valve 210. Accordingly the amount of liquid which will be by-passed back around the pump through the by-pass line 20 will always be directly proportional to the volume of liquid dispensed through the dispensing line, insuring that the by-pass line 20 will by-pass a fixed or predetermined percentage of the dispensed liquid regardless of the dispensing rate. Further, when the check valve 19 is closed, the by-pass valve 210 will also be closed. The amount which the valve 210 will be opened by the check valve may be varied to accurately calibrate the pump by moving the pivot connection 217 outwardly or inwardly along the slot 218 of the lever 212. The slot 219 in link 213 permits adjustment of the pivot point with respect to the link whereby to insure that valve 210 will be closed when check valve 19 is closed in all positions of the pivot 217 along the slot 218.

In Figs. 32, 33 and 34 an embodiment of the invention is illustrated wherein the control valve for the power diverting mechanism is actuated and controlled by the rate or volume of liquid flow within the dispensing line. The dispensing line 12 is provided with a check valve 220 arranged adjacent the liquid control circuit 30. The check valve has a valve member 221 which is opened by the liquid flow through the dispensing line, the opening of the valve being proportional to the rate or volume of flow. Valve member 221 has rigidly secured thereto a sector member 222 in toothed engagement with the gear wheel 223 fixed to the end of a valve stem member 224. The stem 224 is threaded into a plug 225 provided as a part of the casing of the control valve 226. A tension spring 227 normally pulls the sector upwardly into the position shown in Fig. 33 wherein the check valve member 221 is in closed position. The core member 228 of the control valve is adapted for sliding movement within the valve casing and is provided with passageways adapted to form communication between the pipes 42 as previously described. The core is reciprocated within the casing by rotation of the stem 224, the stem being provided with an enlarged head 229 rotatable within the valve core but prevented from axial movement with respect thereto by means of the plate member 230. Pipe 42 of the control circuit is also provided with a restriction or orifice section 231, the function of which will be later described.

In operation as the motor 24 is started and before the opening of the dispensing valve 17, the main dispensing pump 10 will remain stationary and the auxiliary pumps 41 will be operated as previously described. At this time check valve member 221 is closed so that the control valve 226 is in its open position as shown in Fig. 34. However, due to the presence of orifice pipe section 231, a very slight resistance is imparted to the auxiliary pump 41 even when the control is open, the auxiliary pump thus transmitting a small force through the differential to the main dispensing pump 10 tending to drive the same. The dispensing pump will not at this time be driven due to the fact that the nozzle valve 17 is closed, and the small driving force being applied to the dispensing pump is insufficient to cause any tendency of the pump to slip. As the nozzle valve 17 is now opened, dispensing pump 10 will be driven slightly causing the initial opening of check valve member 221. As the check valve opens, control valve core 228 is lowered cutting off liquid flow within the control circuit 30 and thereby applying full driving power to the dispensing pump. When delivering at partial rates of flow, check valve 221 and control valve 226 will both be partially open. In this instance no by-pass is provided around the dispensing pump, the calibration of pump 10 being effected by selecting the proper gear ratio for the register driving gears 80 or, if desired, the displacement capacity of the pump itself may be varied.

In Fig. 35 an arrangement substantially similar to that just described is shown except that the surge device 112 is inserted in the dispensing line between the control check valve 220 and the check valve 19. In operation as the dispensing flow is stopped, the flexible diaphragm 115 of the surge device will be operated and the air within the dome 113 will be compressed as previously described, and these compression conditions will be maintained after the closing of the nozzle valve due to the check valve 19. Accordingly, as the nozzle valve is opened to effect the next dispensing operation, the pressure of the air within dome 113 will be sufficient to start the initial flow of liquid through the control check valve 220. In this form of construction, therefore, the orifice device 231 need not be utilized, and all driving force can be removed from the dispensing pump 10 when not in operation. In this instance the by-pass calibrating line 20 is illustrated as being used, although it, of course, may be omitted, if desired.

In Figs. 36, 37 and 38 a structural embodiment is illustrated wherein the control valve 43 is under the conjoint control of the pressure conditions and the rate of flow within the dispensing line. As illustrated, the dispensing line is provided with the pressure device 63 for effecting the primary operation of control valve 43 as described with reference to Fig. 3. That is, pressure within the dispensing line 12, 13 causes the lowering or opening of the control valve, and relief of pressure within the dispensing line causes the raising or closing of the valve. The valve stem 53, however, is additionally provided with a collar 235 adapted to be engaged by a lever 236 secured to a check valve member 237 provided in a check valve 238 arranged in the dispensing line. A tension spring 239 urges lever 236 downwardly and the check valve member into closed position. In operation, during dispensing, lever 236 will be held in its upper full line position, as shown in Fig. 37, due to the liquid flow within the dispensing line. At this time pressure within the dispensing line is relieved, and the control valve 43 will be closed as shown in Fig. 37. Partial rate dispensing may be effected under the control of the pressure device 63 in the manner previously described, the lever 236 being held continuously inoperative at this time. But as the nozzle valve 17 is closed at the end of the dispensing operation, and liquid flow within the dispensing line entirely ceases, lever 236 then is lowered to its dotted line position by spring 239, engaging the collar 235 and insuring the full opening of the control valve 43. The spring 70 of the pressure device is somewhat stronger than spring 239 so that upon complete relief of pressure within the dispensing line, as the nozzle valve is opened to effect the next dispensing operation, the valve stem 53 will be raised and the control valve closed to apply driving power to the dispensing pump 10.

In Figs. 39 to 42 inclusive an arrangement is shown for disconnecting the driving connections between the dispensing pump and the register mechanism when no liquid is being dispensed. A check valve 245 is arranged in the dispensing line, this valve being provided with a valve member 246 having an arm 247 rigidly secured thereto. The arm 247 is adapted to operate a switch 248 by means of a pivot pin connection 249, a compression spring 250 being provided for normally holding the arm 247 in raised position, at which time switch 248 and check valve member 246 will both be closed. Switch 248 is electrically connected by means of wires 251 with a solenoid-operated clutch device 252 arranged in the driving connections between the dispensing pump and the register mechanism. The driving connections between the dispensing pump and the register include a lower shaft 253 adapted to be driven from the dispensing pump by means of gearing 254 and 255, and an upper shaft 256 connected to drive the register mechanism in the manner previously described. The clutch device 252 is adapted to connect and disconnect the driving engagement between shafts 253 and 256. As shown in Fig. 42, a driving clutch plate 257 is secured to shaft 253, and a driven clutch plate 258 is keyed to shaft 256 as indicated at 259 for rotation with the shaft, but for limited sliding movement therealong. A compression spring 260 normally urges the clutch plate 258 downwardly into engagement with plate 257, and plate 258 is adapted to be raised, as shown in Fig. 42, by means of armature core 261 secured thereto adapted to be operated by solenoid magnet 262. Switch device 248 receives its power by means of electric wires 263 controlled from the motor switch 25, the arrangement being such that the electrical control system will be energized only when switch 25 is closed to energize motor 24.

As here illustrated, a simplified form of control circuit 30 for the auxiliary pump 41 may be used, and as illustrated comprises merely a closed circuit pipe 265 having arranged therein the spring pressed relief valve 45, as shown in Fig. 2. In this instance the adjustment 50 of the valve will be set so that the valve will open to permit operation of the auxiliary pump, when the pressure within the dispensing line builds up to some suitable pressure which is slightly greater than the pressure necessary to effect full rate dispensing operations. In other words, when nozzle valve 17 is closed while motor 24 is operating and pressure within the dispensing line builds up above the normal dispensing pressure, due to the driving force transmitted to the dispensing pump 10, valve 45 will automatically open permitting the diverting of power from the main dispensing pump to the auxiliary pump 41. Pump 41 operates and the predetermined pressure is maintained in the dispensing line. When the nozzle valve is opened, pressure within the dispensing line drops, dispensing pump 10 starts and control valve 45 automatically closes to stop the operation of auxiliary pump 41. Valve 45 thus constitutes an automatically operable relief valve for diverting power from the dispensing pump 10 when the motor 24 is in operation and the nozzle valve 17 is closed.

In the operation of the register disconnecting means, as hose support 18 is raised and before the opening of nozzle valve 17, switch 25 will be closed to energize the electric control system. At this time, check valve member 246 being closed, switch 248 is also closed thereby energizing solenoid magnet 262 holding the clutch plate 258 in its upper or disconnected position as shown in Fig. 42. This position of the parts is assumed immediately as the hose hook 18 is raised and the motor 24 started. Accordingly even if the dispensing pump 10 should be inadvertently moved, no liquid being dispensed, the driving connections to the register mechanism would be disconnected and erroneous registrations thereto would not be transmitted. Immediately as the nozzle valve is opened and dispensing begins, check valve member 246 is opened, opening switch 248. This deenergizes solenoid 262 allowing spring 260 to lower clutch plate 258, closing the clutch and establishing driving connection between the dispensing pump and the register mechanism. During dispensing the pump will be connected to the register, but when dispensing is not taking place and when the motor 24 is operating, driving connections between the pump and the register will be disconnected.

In Figs. 43 and 44 a wholly mechanical arrangement for disconnecting the driving connections to the register under control of the check valve 245 is illustrated. In this instance the valve member 246 of the check valve is arranged to operate a clutch control arm 267 by means of connections later to be described. Arm 267 has a yoke connection 268 with a clutch plate member 269, this clutch plate member being non-rotatably but slidably connected with register shaft 256 by key connection 270, as previously described. Driving clutch plate 271 is secured to shaft 253 as before, and a compression spring 272 is arranged between the clutch plates for normally holding them separated. When dispensing is not being effected, spring 272 holds the clutch disconnected, but as flow takes place within the dispensing line, check valve member 246 is immediately opened closing the clutch against spring 272 and establishing driving connections from the dispensing pump to the register mechanism.

The arrangement is such that the valve member 246 is free to continue its opening movement after the clutch plates have been engaged. As seen in Fig. 44, valve member 246 is fixed to its pivot shaft 273 whereas the arm 267 is loosely mounted upon the end of the shaft. A pin 274 is secured to the shaft and adapted for engagement with a shoulder 275 formed on the arm. A coiled spring 276 anchored to the shaft at one end and to the arm 267 at the other, normally urges the arm counterclockwise as seen in Fig. 43 holding the pin 274 and the shoulder 275 on the arm in engagement. It will be seen that as the valve member 246 is opened, arm 267 moves counterclockwise therewith to engage the clutch, but the valve member 246 is free to open further after clutch engagement, the pin 274 moving away from the shoulder 275 and the spring 276 yielding to permit this movement. The spring 276 is stronger than the spring 272, but sufficiently yielding to permit the necessary opening of the valve member 246. The clutch engages immediately upon the opening of valve 246, but the valve is thereafter free to move as wide as may be necessary to accommodate fluid flow.

In Figs. 45, 46, 47 and 50 a form of structure is illustrated employing a cylinder type of pump as indicated at 280. As best shown in Fig. 46, inlet pipe 8 leading from the underground tank and dispensing line 12 are connected with a rotary valve member 281 which is driven from the differential gearing 28 by shaft 282. The valve is provided with an inlet annular channel 283 in communication with the inlet pipe 9 and with an outlet annular channel 284 in communication with the dispensing line 12. The valve is also provided with a pair of semi-annular channels 285 and 286 separated from each other on opposite sides of the valve member, one of the separation points being indicated at 287. A passageway 288 communicates with channels 283 and 285 and a passageway 289 communicates with channels 284 and 286. The cylinder block 290 is provided with a series of radial passageways 291, one passageway leading to each of the cylinders 292, of which there are four in the particular embodiment of pump illustrated. Diaphragm piston devices, shown in detail in Fig. 47, are arranged for actuation within the cylinders. Each of these devices comprises a flexible diaphragm 293 secured at its inner end 294 to a plate 295 bolted to the cylinder, this plate being provided with openings 296 to prevent air-lock of the diaphragm. The outer end 297 of the diaphragm is connected to a plate 298 secured to a piston rod 299. This rod is slidable within a bearing 300 formed as a part of plate 295, and is threadedly secured at its inner end to a piston pin bearing-block 301 carrying a piston pin 302. The connecting rods 303 for operating the piston devices are pivotally connected at their outer ends to the piston pins 302, and at their inner ends the connecting rods are provided with sleeves concentrically mounted upon a crank pin 304, the outer sleeves being slotted as indicated at 305 to accommodate for the movements of the connecting rods. As best shown in Fig. 50, the crank pin 304 is carried by a block 306 radially adjustable along the length of the crank arm 307 which is secured to the end of pump shaft 282 and rotatable therewith. An adjustment screw 308 is provided for adjusting the radial position of the crank pin block 306.

In operation as the pump shaft 282 is driven from the differential, semi-annular channel 285, which is permanently in communication with the inlet pipe 9, and semi-annular channel 286, which is permanently in communication with the dispensing line 12, are presented alternately and in sequence to the several passages 291 leading to the cylinders. Simultaneously the movement of the crank pin 304 causes the reciprocation of the piston devices. The arrangement is such that when a diaphragm is being compressed its cylinder will be connected to the inlet pipe 9, and when the diaphragm is being expanded, its cylinder will be connected to the dispensing line 12 thereby causing the pumping of liquid outwardly through the dispensing line. The pump may be calibrated by means of the adjustment screw 308 which varies the crank pin throw, thereby varying the displacement of the piston devices. Accordingly by-pass calibrating means around the pump are unnecessary. Also, the diaphragms 293 preclude any leakage or liquid slippage within the pump cylinders thereby precluding pump slippage within the cylinders. This form of pump is particularly well adapted for use with a control circuit such as described with reference to Fig. 39 and which, as illustrated, comprises merely a pipe 265 in closed circuit with the auxiliary pump 41 and controlled by the spring pressed relief valve 45.

In Fig. 48 an alternate form of piston and cylinder construction is illustrated comprising a piston 310 reciprocable within a bearing plate 311 bolted to the cylinder 292. A flexible diaphragm member 312, which may be of rubber or the like, encloses the piston and is clamped at its inner end 313 between the bearing plate 311 and the cylinder wall. The diaphragm member 312 yields to accommodate the reciprocations of the piston within the cylinder, but positively precludes any liquid leakage or slippage between the piston and cylinder walls.

In Fig. 49 a still further embodiment of the piston and cylinder structure is shown, the piston 315 in this instance being of substantially conventional character and provided with packing rings 316 for preventing liquid leakage between the piston and cylinder walls.

In Fig. 51 an embodiment of the invention is illustrated incorporating the control mechanism of Figs. 11, 12 and 13, the by-pass structure heretofore described in reference to Figs. 28, 30 and 31, the register disconnecting mechanism of Figs. 39 to 42 inclusive, and the form of pump structure heretofore described with reference to Figs. 45, 46, 47 and 50.

It is obvious that various changes may be made in the specific embodiments of the invention set forth for the purposes of illustration without departing from the spirit of the invention, or that the various features heretofore set forth may be used interchangeably in the various embodiments or in certain instances omitted. For example, a pump structure such as shown in Fig. 45 might be used with a control mechanism such as shown in Fig. 1, and including also means for disconnecting the register as illustrated in Fig. 39. The invention is accordingly not to be limited to the particular embodiments set forth, but only as indicated in the following claims.

The invention is hereby claimed as follows:

1. A liquid dispensing apparatus comprising a dispensing line, a dispensing pump for propelling liquid through the dispensing line, a power source, power connections between the power source and pump for driving said pump, said power source being adapted to operate continuously during the dispensing cycle, and power diverting mechanism for diverting the power of the power source from the pump, a fluid control circuit for controlling the power diverting mechanism, a control pump for propelling fluid through the fluid control circuit, and a valve having a valve element for controlling the flow of fluid within the control circuit, said element being balanced in respect to fluid pressure within said circuit, whereby the element experiences uniform resistance to shifting movement under various fluid pressure conditions.

2. A liquid dispensing apparatus comprising a dispensing line, a dispensing pump for propelling liquid through the dispensing line, a power source power connections between the power source and pump for driving said pump, said power source being adapted to operate continuously during the dispensing cycle, and power diverting mechanism for diverting the power of the power source from the pump, a recirculation fluid control circuit for controlling the power diverting mechanism, a control pump for propelling fluid through the fluid control circuit, and a valve having a valve element for controlling the flow of fluid within the control circuit, said valve being provided with an annular fluid communicating channel surrounding the valve element whereby the valve element will be balanced in respect to pressure conditions within the fluid circuit.

3. A liquid dispensing apparatus comprising a dispensing line, a pump for propelling liquid through the dispensing line, a power source for driving the pump, said power source being adapted for constant operation during the dispensing cycle, power diverting mechanism for diverting the power connection between the power source and the pump, a fluid control circuit for controlling the power diverting mechanism, a control valve for the control circuit, and means controlled by the pressure conditions within the dispensing line for operating said control valve, said valve operating means including primary and secondary operating mechanism, the secondary operating mechanism being provided for insuring the complete operation of the valve.

4. A liquid dispensing apparatus as defined in claim 3 wherein said secondary operating mechanism comprises toggle mechanism connected to the primary valve operating means.

5. A liquid dispensing apparatus comprising a dispensing line, a pump for propelling liquid through the dispensing line, a power source for driving the pump, said power source being adapted for constant operation during the dispensing cycle, power diverting mechanism for diverting the power connection between the power source and the pump, a fluid control circuit for controlling the power diverting mechanism, a control valve for the control circuit, and electrical means for operating said control valve.

6. A liquid dispensing apparatus as defined in claim 5 wherein said electrical means is controlled by the pressure conditions within the dispensing line.

7. A liquid dispensing apparatus comprising a dispensing line, a dispensing pump for propelling liquid through the dispensing line, a power source, power connections between the power source and pump for driving the pump, said power source being adapted for constant operation during the dispensing cycle, power diverting mechanism for diverting the power of the power source from the pump, and a recirculation fluid control circuit for controlling the power diverting mechanism, said dispensing line forming a part of the fluid control circuit.

8. A liquid dispensing apparatus comprising a dispensing line terminating in a dispensing nozzle havng a dispensing valve, a dispensing pump for propelling liquid through the dispensing line, a power source, power connections between the power source and pump for driving the pump, said power source being adapted for constant operation during the dispensing cycle, power diverting mechanism for diverting the power of the power source from the pump, a fluid control circuit for controlling the power diverting mechanism, a control pump for propelling fluid through the fluid control circuit, and a control valve disposed in the control circuit, said control valve being located adjacent said dispensing valve and being shiftable therewith.

9. A liquid dispensing apparatus comprising a dispensing line terminating in a dispensing nozzle provded with a nozzle valve, a pump for propelling liquid through the dispensing line, a power source, power connections between the power source and pump for driving the pump, said power source being adapted for constant operation during the dispensing cycle, power diverting mechanism for diverting the power of the power source from the pump, a fluid control circuit for controlling the power diverting mechanism, and a control valve disposed in the control circuit, said control valve being connected to the nozzle valve for movement therewith.

10. A liquid dispensing apparatus comprising a dispensing line, a pump for propelling liquid through the dispensing line, a power source, power connections between the power source and pump for driving the pump, said power source being adapted for constant operation during the dispensing cycle, power diverting mechanism for diverting the power of the power source from the pump, a fluid control circuit for controlling the power diverting mechanism, a control valve disposed in the control circuit, said control valve being provided with primary and secondary fluid passages of different size to provide different flow rates within said control circuit to thereby variously control the amount of power to be diverted through said power diverting mechanism.

11. A liquid dispensing apparatus comprising a dispensing line terminating in a dispensing nozzle provided with a nozzle valve, a pump for propelling liquid through the dispensing line, a power source, power connections between the power source and pump for driving the pump, said power source being adapted for constant operation during the dispensing cycle, power diverting mechanism for diverting the power of the power source from the pump, a fluid control circuit for controlling the power diverting mechanism, a control valve for the control circuit, said control valve being connected to the nozzle valve for movement therewith, said nozzle valve being provided with primary and secondary liquid passages for dispensing at full or partial rates of flow, and said control valve being provided with primary and secondary fluid passages for cooperation therewith.

12. A liquid dispensing apparatus comprising a dispensing line, a pump for propelling liquid through the dispensing line, a power source for driving the pump, a by-pass line leading around the pump from the outlet to the inlet side thereof, a valve for controlling said by-pass line, operating mechanism for the valve, a valve-like member disposed within the dispensing line in the path of liquid flow and against which liquid flowing within the dispensing line is impinged, whereby said member is shifted in direct proportion to the volume of fluid flow within said dispensing line, and means interconnecting said member and said valve operating mechanism for proportional movement, whereby said valve opening is proportionally increased and decreased as flow within the dispensing line increases and decreases.

13. A liquid dispensing apparatus comprising a dispensing line, a pump for propelling liquid through the dispensing line, a power source, power connections between the power source and pump for driving the pump, said power source being adapted for constant operation during the dispensing cycle, power diverting mechanism for diverting the power of the power source from the pump, a by-pass line leading around the pump from the outlet to the inlet side thereof, a valve for controlling said by-pass line, operating mechanism for the valve, a valve-like member disposed within the dispensing line in the path of liquid flow and against which liquid flowing within the dispensing line is impinged, whereby said member is shifted in direct proportion to the volume of fluid flow within said dispensing line, and means interconnecting said member and said valve operating mechanism for proportional movement, whereby said valve opening is proportionally increased and decreased as flow within the dispensing line increases and decreases.

14. A liquid dispensing apparatus comprising a dispensing line terminating in a dispensing nozzle provided with a nozzle valve, a pump for propelling liquid through the dispensing line, a power source for driving the pump, and a shock absorbing bellows arranged in the dispensing line for absorbing the liquid shock within said line upon the closing of the nozzle valve.

15. A liquid dispensing apparatus comprising a dispensing line, a pump for propelling liquid through the dispensing line, register mechanism connected to said pump for operation thereby, a power source for driving the pump, mechanical connections continuously interconnecting the power source and the pump, means for stopping flow within the dispensing line and operation of the pump while the power source remains in operation, and automatically operable means for disconnecting the drive from the pump to the register mechanism when flow within the dispensing line stops and while the power source remains connected to the pump, whereby any movement imparted to the pump from the power source during non-flow of liquid within the dispensing line will not be transmitted to the register.

16. A liquid dispensing apparatus comprising a dispensing line, a pump for propelling liquid through the dispensing line, register mechanism connected to said pump for operation thereby, a power source, mechanical connections continuously interconnecting the power source and pump for driving the pump, said power source being adapted for constant operation during the dispensing cycle, power diverting mechanism for diverting the power of the power source and the pump, from automatically operable means for disconnecting the drive from the pump to the register mechanism when flow within the dispensing line stops and while the power source remains connected to the pump, whereby any movement imparted to the pump from the power source during non-flow of liquid within the dispensing line will not be transmitted to the register.

17. A liquid dispensing apparatus comprising a dispensing line, a pump for propelling liquid through the dispensing line, register mechanism connected to said pump for operation thereby, a power source, mechanical connections continuously interconnecting the power source and pump for driving the pump, said power source being adapted for constant operation during the dispensing cycle, power diverting mechanism for diverting the power of the power source from the pump, and automatically operable means for disconnecting the drive from the pump to the register mechanism when flow within the dispensing line stops and while the power source remains connected to the pump, said last named means comprising a valve arranged in the dispensing line operated by the flow of liquid therein and electric connections operated thereby.

18. A liquid dispensing apparatus comprising a dispensing line, a pump for propelling liquid through the dispensing line, a power source, mechanical connections continuously interconnecting the power source and pump for driving the pump, said power source being adapted for constant operation during the dispensing cycle, and power diverting mechanism for diverting the power of the power source from the pump while the power source remains connected to the pump, said pump being of the cylinder and piston device type.

19. A liquid dispensing apparatus as defined in claim 18 wherein micrometer adjustment means is provided for varying the displacement of the piston devices.

20. A liquid dispensing apparatus as set forth in claim 18 wherein the piston devices comprise flexible bellows.

21. A liquid dispensing apparatus comprising a dispensing line, said line terminating in a dispensing nozzle, a nozzle valve for controlling liquid flow through the dispensing line, a pump for propelling liquid through the dispensing line, a power source for driving the pump, said power source being adapted for constant operation during the dispensing cycle, power diverting mechanism for diverting the power connection between the power source and the pump, and recirculation fluid control circuit for controlling the power diverting mechanism, said fluid control circuit having a spring operated by-pass valve for controlling the flow of fluid through the circuit.

22. A liquid dispensing apparatus comprising a dispensing line having a dispensing outlet, a valve controlling said outlet, a pump for propelling liquid through the dispensing line, a power source for driving the pump, said power source being adapted for constant operation during the dispensing cycle, three-branch differential gearing mechanism interposed in the driving connections between the power source and pump and having two of its branches connected thereto for diverting the power connection between the power source and the pump, an auxiliary pump connected to the third branch of the differential gearing, and a recirculation fluid control circuit connected to the auxiliary pump, said fluid control circuit comprising a spring pressed by-pass valve for controlling the flow of fluid through said circuit, and an additional control valve operated in predetermined timed relation with the operation of said dispensng line outlet valve for also controlling the flow of fluid through said circuit.

RICHARD R. TREXLER.